United States Patent
Yamanouchi

(10) Patent No.: US 11,519,545 B2
(45) Date of Patent: Dec. 6, 2022

(54) INSTALLMENT METHOD OF FLUID CONTROL BODY, AND FLUID CONTROL DEVICE INCLUDING FLUID CONTROL BODY

(71) Applicant: COSMO KOKI CO., LTD., Tokyo (JP)

(72) Inventor: Shinji Yamanouchi, Tokyo (JP)

(73) Assignee: COSMO KOKI CO., LTD.

( * ) Notice: Subject to any disclaimer, the term of this patent is extended or adjusted under 35 U.S.C. 154(b) by 0 days.

(21) Appl. No.: 17/307,939

(22) Filed: May 4, 2021

(65) Prior Publication Data
US 2021/0364116 A1 Nov. 25, 2021

(30) Foreign Application Priority Data
May 19, 2020 (JP) .............................. JP2020-087314

(51) Int. Cl.
| | |
|---|---|
| *F16L 55/105* | (2006.01) |
| *F16K 1/22* | (2006.01) |
| *F16K 27/02* | (2006.01) |
| *F16L 55/07* | (2006.01) |

(52) U.S. Cl.
CPC ............ *F16L 55/105* (2013.01); *F16K 1/221* (2013.01); *F16K 27/0218* (2013.01); *F16L 55/07* (2013.01)

(58) Field of Classification Search
CPC ..... F16L 5/07; F16L 5/18; F16L 5/105; F16L 41/06; Y10T 137/0525; F16K 1/22; F16K 27/0218
See application file for complete search history.

(56) References Cited

U.S. PATENT DOCUMENTS

| | | | |
|---|---|---|---|
| 3,306,316 A | | 2/1967 | Stillwagon ................ F16K 1/22 |
| 5,430,932 A | * | 7/1995 | MacLaggan ............ F16L 41/06 |
| | | | 29/890.125 |
| 5,620,020 A | * | 4/1997 | Collins ................. F16L 55/105 |
| | | | 83/745 |

(Continued)

FOREIGN PATENT DOCUMENTS

| | | | | |
|---|---|---|---|---|
| CA | 2692954 A1 | * | 9/2010 | ............ F16L 55/105 |
| DE | 29801734 U1 | * | 4/1998 | ............... F16L 41/06 |

(Continued)

OTHER PUBLICATIONS

Office Action issued in Singapore Patent Appln. Serial No. 11202103535V, dated Feb. 24, 2022, 10 pages.

(Continued)

*Primary Examiner* — Hailey K. Do
(74) *Attorney, Agent, or Firm* — Hayes Soloway P.C.

(57) ABSTRACT

An installment method of a fluid control body and a fluid control device including a fluid control body with which processes of designing, manufacturing, and managing the fluid control body are simplified to suppress cost of manufacturing, etc, includes a cut-off step of cutting off part of a fluid pipe inside a casing, and an installment step of installing the fluid control body including an on-off valve formed by a valve seat body and a valve element, and a partition body formed by a wall portion, a lid portion, and a seal component, inside the casing in a sealed manner in a state where an operation shaft of the on-off valve is placed in a direction different from the vertical direction.

4 Claims, 23 Drawing Sheets

(56) References Cited

U.S. PATENT DOCUMENTS

| | | | | |
|---|---|---|---|---|
| 6,776,184 | B1 | 8/2004 | Maichel | ............... F16L 55/105 |
| 9,297,487 | B2 * | 3/2016 | Borland | ................. F16L 41/16 |
| 2005/0150550 | A1 | 7/2005 | Maichel | ............. F16K 27/0218 |
| 2014/0374638 | A1 | 12/2014 | Gerceker | ........... F16L 27/0218 |
| 2015/0292627 | A1 | 10/2015 | Yamada | ................. F16K 1/226 |
| 2020/0049259 | A1 | 2/2020 | Yokoyama et al. | .... F16K 1/226 |

FOREIGN PATENT DOCUMENTS

| | | | |
|---|---|---|---|
| EP | 0935088 | 8/1999 | ............. F16L 41/04 |
| EP | 1045182 | 10/2000 | ............. F16K 27/02 |
| GB | 1077383 | 7/1967 | |
| GB | 2465310 | 5/2010 | ............. F16K 43/00 |
| GB | 2472265 | 2/2011 | ............. F16K 43/00 |
| JP | 49126228 | 10/1974 | |
| JP | 6438365 | 3/1989 | ............. F16K 5/06 |
| JP | 552270 | 3/1993 | ............. F16K 3/02 |
| JP | 2006-153178 | 6/2006 | ............. F16L 55/00 |
| JP | 2006250295 | 9/2006 | ............. F16L 55/00 |
| JP | 2006275109 | 10/2006 | ............. F16L 55/00 |
| JP | 2006292001 | 10/2006 | ............. F16L 55/00 |
| JP | 2014119012 | 6/2014 | ............. F16K 43/00 |
| JP | 2017172591 | 9/2017 | ............. F16K 37/00 |
| KR | 10-1938518 | 4/2019 | ............... F16K 1/22 |
| WO | WO2018168339 | 9/2018 | ............. F16K 1/226 |

OTHER PUBLICATIONS

International Preliminary Report on Patentability issued in PCT/JP2019/045055, dated Jul. 8, 2021, 7 pages.

International Search Report (w/ English translation) and Written Opinion issued in PCT/JP2019/045055, dated Jan. 28, 2020, 9 pages.

Examination Report No. 1 issued in Australian Patent Appln. 2021202638, dated May 16, 2022, 8 pages.

Examination Report No. 1 issued in Australian Patent Appln. Serial No. 2019412926, dated May 16, 2022, 7 pgs.

Office Action issued in Canadian Patent Appln. Serial No. 3,115,181, dated Jun. 30, 2022, 3 pages.

U.S. Official Action dated Apr. 27, 2022 issued in related application U.S. Appl. No. 17/283,944, 11 pages.

European Search Report issued in related application Serial No. 19901767.4, dated Aug. 19, 2022, 7 pages.

Taiwan Official Action issued in related application Serial No. 110116786, dated Jul. 18, 2022, 13 pages with translation.

* cited by examiner

INSTALLMENT METHOD OF FLUID CONTROL BODY, AND FLUID CONTROL DEVICE INCLUDING FLUID CONTROL BODY

BACKGROUND OF INVENTION

1. Field of the Invention

The present invention relates to an installment method of installing a fluid control body in a casing that seals a fluid pipe in an uninterrupted flow state, and a fluid control device including a fluid control body.

2. Description of the Related Art

There is a conventional fluid control device in which part of a fluid pipe forming a fluid pipe passage is cut off in a casing fitted onto the fluid pipe in a sealed manner in an uninterrupted flow state, and a fluid control body such as various valves for controlling a fluid in a pipe is installed at the cut point. For example, as shown in JP 2006-153178 A, there is a known fluid control device in which by attaching a casing to a fluid pipe in a sealed manner, attaching a process valve capable of opening/closing the inside of the casing to an opening portion of this casing, setting a cutting machine having a hole saw and a drive portion on the process valve, letting the hole saw go forward by the drive portion in a state where the process valve is opened, cutting off part of the fluid pipe in the casing in an uninterrupted flow state, attaching an inserting machine to the process valve in place of the cutting machine, and letting the fluid control body go forward by the inserting machine, the fluid control body is installed in a sealed manner in the casing via the opening portion in an uninterrupted flow state.

As the fluid control body forming such a fluid control device, JP 2006-153178 A shows a valve main body (fluid control body) formed mainly by an upper lid portion (lid portion) including a seal component which is closely connected to an inner peripheral surface on the opening portion side of the casing, a partition wall (wall portion) integrated with a lower portion of this upper lid portion, the partition wall including a seal component which is closely connected to an inner side surface and a bottom surface of the casing, and a valve element to be operated in such a manner that the opening portion formed to pass through this partition wall is openable/closable.

However, in JP 2006-153178 A, the fluid control body installed inside the casing which is fitted onto the fluid pipe is required to have an outer surface of an elaborate shape which is matched with and closely connected to an inner surface of the casing in which the fluid control body is installed. Thus, there is a need for separately designing details of the fluid control body including the lid and wall portions having outer surfaces of such an elaborate shape and further including the valve element that opens/closes the opening portion of this partition wall by desired control properties. Therefore, there is a problem that not only a process of manufacturing the fluid control body becomes complicated but also manufacturing cost is increased. In particular, depending on a region where a component building a pipeline such as a pipe and a fluid control body is laid, there are differences in specifications and standards such as pressure, coating, and materials, of a fluid pipe and a fluid control body. When details of the fluid control body are separately designed and manufactured according to the differences, the cost becomes enormous and there is also a problem that storage and maintenance of a specific fluid control body become complicated.

An operation shaft for opening/closing the valve element of the fluid control body is extended vertically upward. Thus, when attachments such as a speed reducer connected to an upper end of this operation shaft are included, flow passage control devices including the fluid control body are increased upward, and restriction is caused on an earth covering of the fluid pipe. Therefore, installment is difficult for, for example, a fluid pipeline having small depth of earth covering and there is a problem that versatility is poor.

BRIEF SUMMARY OF INVENTION

The present invention is achieved focusing on such problems, and an object thereof is to provide an installment method of a fluid control body and a fluid control device including a fluid control body with which processes of designing, manufacturing, and managing the fluid control body are simplified to suppress cost of manufacturing, etc., and such high versatility that installment can be made irrespective of a laid environment of a fluid pipeline and desired control properties are provided.

In order to solve the problems described above, an installment method of a fluid control body according to the present invention is an installment method of a fluid control body of installing the fluid control body that controls a fluid in a pipe inside a casing externally fitted onto a fluid pipe in a sealed manner in an uninterrupted flow state, the installment method including a cut-off step of cutting off part of the fluid pipe inside the casing, and an installment step of installing the fluid control body inside the casing. The installment method includes an on-off valve formed by a valve seat body which includes an opening portion and a valve element which is provided in the valve seat body in such a manner that the opening portion is openable and closable, and a partition body formed by a wall portion that is provided a through hole communicating with the opening portion, the wall portion being mounted on the valve seat body in a sealed manner, and a lid portion which is provided continuously to the wall portion, the lid portion covering an opening side of the casing, the partition body including a seal component that seals a gap between an inner surface of the casing and the partition body. In the installment step, the fluid control body being installed inside the casing in a sealed manner in a state where an operation shaft of the on-off valve is placed so as to extend in a direction different from the vertical direction.

According to this feature of the present invention, as the fluid control body installed in the casing which is externally fitted onto the fluid pipe in a sealed manner, the on-off valve formed by the valve seat body and the valve element that opens/closes the opening portion, and the partition body formed by the wall portion which is mounted on the valve seat body and the lid portion covering an opening of the casing, the partition body including the seal component that seals the gap between the inner surface of this casing and the partition body are formed separately from each other. Thus, without requiring a fluid control body whose details are designed and manufactured according to a shape of the casing, it is possible to adopt a standardized or commercialized product which is highly versatile as an on-off valve and has desired fluid control properties, and also to hold a sealing property in the casing by the partition body placed between this on-off valve and the inner surface of the casing. The partition body is formed by the wall portion enclosing the opening portion of the valve seat body and the lid portion provided continuously to this wall portion. Thus, structural strength and rigidity of the partition body are enhanced and it is possible to maintain the sealing property against pressure fluctuation and flow rate fluctuation of the fluid in the pipe. Further, the fluid control body is installed in a state where the operation shaft of the on-off valve is placed so as to extend in the direction different from the vertical direction. Thus, it is possible to provide the fluid control body with which such high versatility that installment can be made irrespective of a laid environment of a fluid pipeline such as earth covering the fluid pipe and desired control properties are provided.

The installment step may be a step of inserting and installing the fluid control body to an inside of the casing in the substantially horizontal direction. According to this feature, there is no need for arranging a jig for installing the fluid control body on the vertically upper side. Thus, it is possible to simplify a load bearing structure of the jig.

The installment step may be a step of installing the fluid control body by using a load receiving portion that slidably supports the fluid control body. According to this feature, by slidably supporting the fluid control body by using the load receiving portion, it is possible to precisely install the fluid control body at a predetermined position while supporting the fluid control body in a horizontally-held state.

The installment step may be a step of inserting and installing the fluid control body substantially vertically downward to an inside of the casing. According to this feature, it is possible to minimize a plane area around the fluid pipe required for work. Thus, it is possible to simplify supplementary works such as open-cut and excavation works.

The installment step may be a step of installing the fluid control body by using plural shaft members to be attached to and detached from each other in an installment direction of the fluid control body. According to this feature, it is possible to compactify a jig for installing the fluid control body and a work region.

A fluid control device according to the present invention is a fluid control device including a fluid control body that controls a fluid in a pipe, the fluid control body being installed in a sealed manner inside a casing which is externally fitted onto a fluid pipe in a sealed manner at a point where part of the fluid pipe is cut off in an uninterrupted flow state. The fluid control body includes an on-off valve formed by a valve seat body which includes an opening portion and a valve element which is provided in the valve seat body in such a manner that the opening portion is openable and closable, and a partition body formed by a wall portion which includes a through hole communicating with the opening portion, the wall portion being mounted on the valve seat body in a sealed manner, and a lid portion which is provided continuously to the wall portion, the lid portion covering the opening side of the casing, the partition body including a seal component that seals a part from an inner surface of the casing. The fluid control body is installed inside the casing in a sealed manner in a state where an operation shaft of the on-off valve is placed so as to extend in a direction different from the vertical direction.

According to this feature of the present invention, as the fluid control body installed in the casing which is fitted externally onto the fluid pipe in a sealed manner, the on-off valve formed by the valve seat body and the valve element that opens/closes the opening portion, and the partition body formed by the wall portion which is mounted on the valve seat body and the lid portion covering an opening of the casing, the partition body including the seal component that seals the part from the inner surface of this casing are formed separately from each other. Thus, without requiring a fluid control body whose details are designed and manufactured according to a shape of the casing, it is possible to adopt a standardized or commercialized product which is highly versatile as an on-off valve and has desired fluid control properties, and also to hold a sealing property in the casing by the partition body placed between this on-off valve and the inner surface of the casing. The partition body is formed by the wall portion enclosing the opening portion of the valve seat body and the lid portion provided continuously to this wall portion. Thus, structural strength and rigidity of the partition body are enhanced and it is possible to maintain the sealing property against pressure fluctuation and flow rate fluctuation of the fluid in the pipe. Further, the fluid control body is installed in a state where the operation shaft of the on-off valve is placed in the direction different from the vertical direction. Thus, it is possible to provide the fluid control device with which such high versatility that installment can be made irrespective of a laid environment of a fluid pipeline such as earth covering of the fluid pipe and desired control properties are provided.

An axial hole through which the operation shaft of the on-off valve is inserted may be formed in the lid portion. According to this aspect, by the operation shaft inserted through to the outside of the casing via the axial hole, it is possible to operate the valve element in the casing to open/close.

The operation shaft of the on-off valve may extend in the direction different from the lid portion. According to this aspect, the operation shaft of the on-off valve is not brought into contact with the lid portion. Thus, there is no need for forming an axial hole or a space in the lid portion and it is possible to enhance freedom in designing.

BRIEF DESCRIPTION OF DRAWINGS

FIG. 9(a) is a front view;

FIG. 9(b) is a plan view; and FIG. 9(c) is a side view.

FIGS. 10(a), 10(b) and 10(c) are views showing a partition body forming the fluid control body.

FIG. 10(b) is a side view; and FIG. 10(c) is a plan view.

FIGS. 12(a) and 12(b) are views showing the fluid control body of FIG. 11: FIG. 12(a) is a plan view showing a step of attaching the butterfly valve.

FIG. 13(a) is a plan view showing a step of attaching the butterfly valve; and FIG. 13(b) is a front view.

DETAILED DESCRIPTION OF INVENTION

Figure 1:
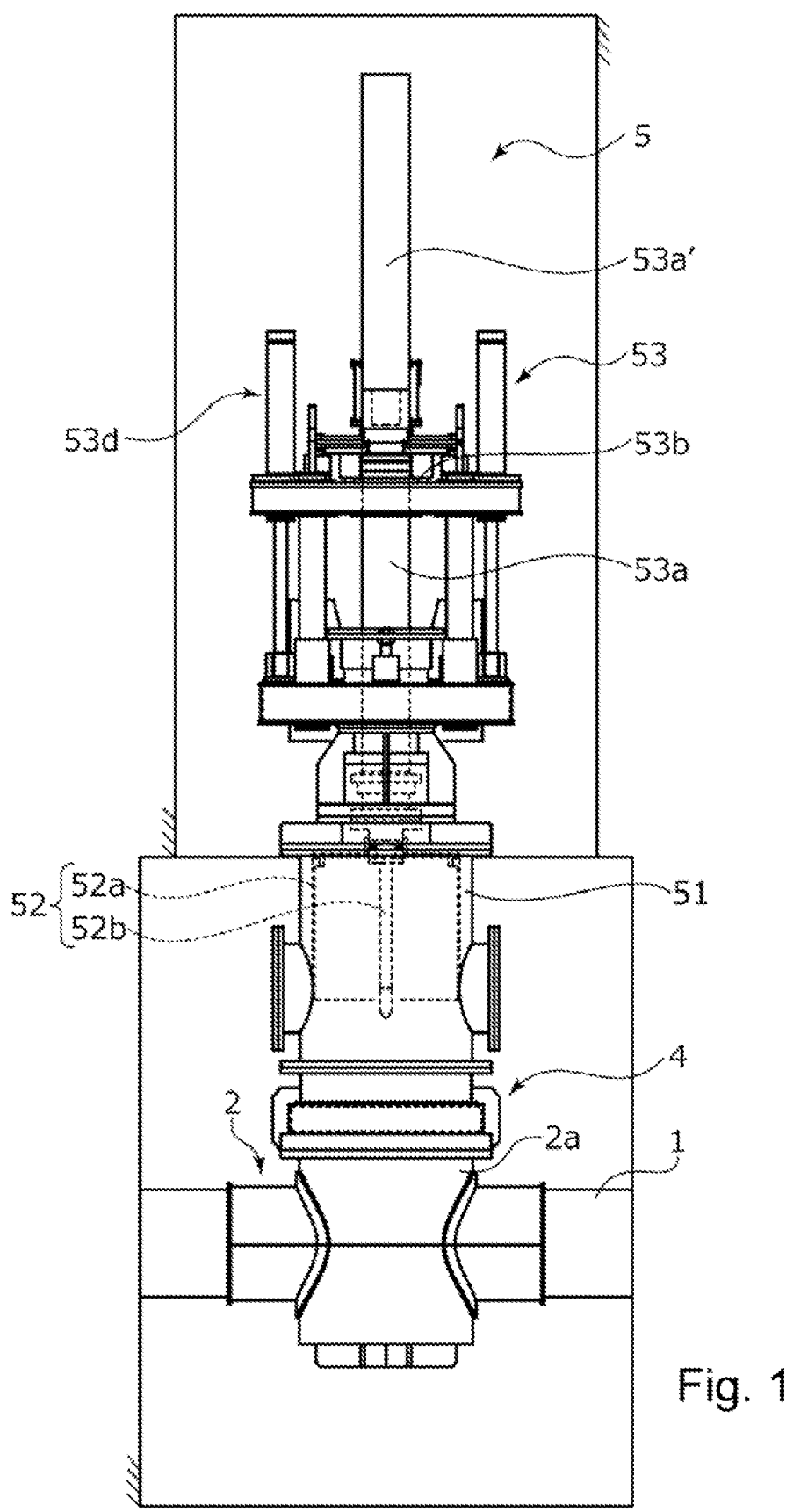
FIG. 1 is a plan view showing a state where a process valve and a cutting machine are attached to a casing of a first embodiment.

Modes for carrying out an installment method of a fluid control body and a fluid control device including a fluid control body according to the present invention will be described below based on embodiments.

First Embodiment

An installment method of a fluid control body and a fluid control device including a fluid control body according to a first embodiment will be described with reference to FIGS. 1 to 13. In the first embodiment, a series of flows of fitting a casing 2 on an already-installed fluid pipe 1 forming a component building a pipeline in a sealed manner, cutting off by a cutting machine 5 that approaches a predetermined point of the fluid pipe 1 in the casing 2 in the substantially horizontal direction, and installing a fluid control body 10 by an inserting machine 6 that approaches the cut point in the substantially horizontal direction as well to form the fluid control device in an uninterrupted flow state will be described. The fluid control device of the first embodiment is formed mainly by the fluid control body 10 and the casing 2 as shown in FIG. 5.

As shown in FIG. 1, for example, a periphery of the predetermined point of the fluid pipe 1 embedded in the ground is dug up, and the casing 2 of a horizontally-evenly-divided structure having a branch portion 2a which opens on the side which is one side in the horizontal direction and communicates with the inside is fitted on to surround the point in a sealed manner. A fluid in the fluid pipe 1 may be, for example, clean water, industrial water, sewer, etc., and in addition, a gas, or a gas-liquid mixture. Further, although the casing 2 has the evenly-divided structure in the present embodiment, the casing 2 may have other severally-divided structures. Although bonding of divided casings is welding in the present embodiment, the present invention is not limited to this but the divided casings may be attached by bolts via a packing, for example.

The fluid pipe 1 is a steel pipe formed in a substantially circular shape in a sectional view. The fluid pipe according to the present invention may be made of metal such as ductile cast iron, other cast irons, stainless steels, or steels, concrete, vinyl chloride, polyethylene, polyolefin, etc. Further, an inner peripheral surface of the fluid pipe may be coated with an epoxy resin layer, mortar, plating, etc., or the inner peripheral surface of the fluid pipe may be coated with an appropriate material by powder coating.

In the present embodiment, the fluid pipe 1 and both ends of the casing 2 in the pipe axis direction are connected by welding in a state where a sealing property and quake resistance are provided. The fluid pipe 1 and both the ends of the casing 2 in the pipe axis direction may be connected not necessarily by welding but by circumferentially-divided pressing rings each of which includes a packing and a locking member as long as the fluid pipe 1 and both the ends are connected in a sealed manner. Further, by providing and appropriately screwing plural centering bolts in the casing 2 along the circumferential direction of the fluid pipe 1, the casing 2 may be able to be centered with respect to the fluid pipe 1. At the time of attaching the casing 2 to the fluid pipe 1 in a sealed manner, a foundation component (not shown) such as concrete foundation or a jack may be formed on the lower side of the casing 2 to support weight around the casing 2 and prevent bend of the fluid pipe 1, etc.

Figure 2:
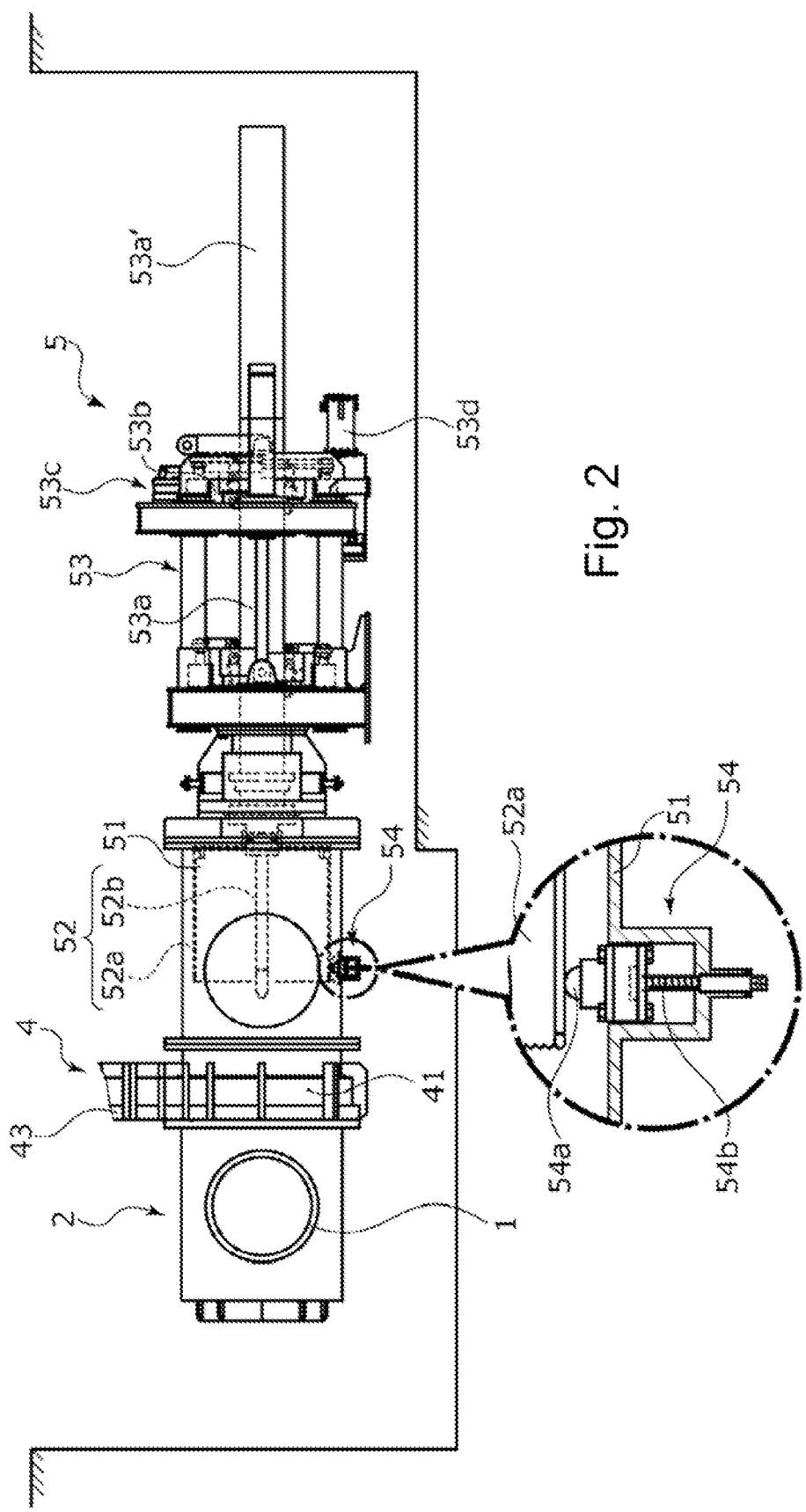
FIG. 2 is a side view as well as FIG. 1.

Next, as shown in FIGS. 1 and 2, a cut-off step of cutting off the fluid pipe 1 in the casing 2 by the cutting machine 5 will be described. First, a process valve 4 capable of opening/closing an opening of the casing 2 is attached to a flange portion of the branch portion 2a of the casing 2. The process valve 4 is formed mainly by a valve box 41 connected to the branch portion 2a of the casing 2 in a sealed manner in a communicated state, a valve lid 43 connected to the upper side of this valve box 41 in a sealed manner in a communicated state, and a valve element (not shown) slidably arranged over the inside of the valve box 41 and the inside of the valve lid 43.

That is, the process valve 4 has a structure of closing the casing 2 in a sealed manner when the valve element is positioned in the valve box 41, and opening the casing 2 when the valve element is positioned in the valve lid 43.

The cutting machine 5 for cutting off the fluid pipe 1 is installed on the further side of the process valve 4. The cutting machine 5 is formed mainly by an attachment flange cylinder 51 connected to the valve box 41 in a sealed manner in a communicated state, the attachment flange cylinder passing through in the horizontal direction, a cutter 52 arranged in this attachment flange cylinder 51, and a drive mechanism 53 for moving this cutter 52 in the horizontal direction and driving and rotating the cutter 52 on the axis of the horizontal direction.

Further, the cutter 52 provided in the cutting machine 5 of the present embodiment is formed as a so-called hole saw, and formed by a cylindrical member 52a having a larger diameter than that of the fluid pipe 1 and including a cutting blade at a leading end, and a center drill 52b arranged coaxially to this cylindrical member 52a, the center drill projecting on the front side of a boring blade. The cylindrical member 52a and the center drill 52b are fixed to each other.

The drive mechanism 53 provided in the cutting machine 5 of the first embodiment is formed mainly by a shaft member 53a whose leading end is connected to a rear end of the cutter 52, a gripping member 53*b* that grips or cancels gripping of the shaft member 53*a*, a rotary drive portion 53*c* that transmits rotary drive force on the axis of the shaft member 53*a* to the gripping member 53*b*, and a forward/backward drive portion 53*d* that transmits forward/backward drive force to the gripping member 53*b* in the axial direction of the shaft member 53*a*. An extension shaft member 53*a'* is prepared and connected in the axial direction to a rear end of the shaft member 53*a* to which the cutter 52 is connected. Although not particularly shown in the figures, another extension shaft member can be connected to a rear end of this shaft member 53*a'*. The extension shaft member 53*a'* may be connected after letting the shaft member 53*a* go forward.

Next, although not particularly shown in the figures, the valve element of the process valve 4 is retreated into the valve lid 43 and the branch portion 2*a* is opened, and by using the cutting machine 5 described above, while driving and rotating the cutter 52 and letting the cutter 52 go forward in the substantially horizontal direction to the fluid pipe 1 by the drive mechanism 53, the fluid pipe 1 is cut off in an uninterrupted flow state.

With the drive mechanism 53 formed in such a way, by transmitting the rotary drive force to the gripping member 53*b* gripping the shaft member 53*a* by the rotary drive portion 53*c*, it is possible to give rotary force for boring the fluid pipe 1 to the cutter 52 connected to this shaft member 53*a*. It is preferable that the gripping member 53*b* gripping the shaft member 53*a* is once let go forward by a stroke of predetermined length in the axial direction by the forward/backward drive portion 53*d* and then gripping and fixing are made by another gripping member provided on the casing 2 side. However, the present invention is not limited to this. By cancelling gripping after going forward, letting only the gripping member 53*b* go backward, and then gripping the shaft member 53*a* again, it is possible to let this shaft member 53*a* go forward again. By repeating this drive stroke, it is possible to make the length of the stroke of the forward/backward drive portion 53*d* shorter than movement length by which the shaft member 53*a* is moved for boring the fluid pipe 1. Therefore, the forward/backward drive portion 53*d* can drive and let the long shaft member 53*a* or the extension shaft member 53*a'* connected to this shaft member 53*a* go forward/backward. Thus, the cutting machine 5 is shortened in the axial direction, so that the whole device can be downsized, and not only handling becomes easier but also an excavation soil amount can be suppressed to reduce the manhour and cost of supplementary works.

As shown in FIG. 2, a load receiving portion 54 that supports a load of the cutter 52 is provided in a lower end of the attachment flange cylinder 51. This load receiving portion 54 is formed mainly by a roller portion 54*a* arranged inside the attachment flange cylinder 51, the roller portion whose curved outer surface is rollably brought into contact with an outer peripheral surface of the cutter 52 to support weight, and an operation portion 54*b* to be screwed to the attachment flange cylinder 51 for moving this roller portion 54*a* upward/downward. By operating and turning the operation portion 54*b* from the outer side of the attachment flange cylinder 51, it is possible to adjust a position of the roller portion 54*a* in the up and down direction to an appropriate position on the inner side of the attachment flange cylinder 51.

By slidably supporting the cutter 52 by using the load receiving portion 54 in such a way, it is possible to precisely guide the cutter 52 to a predetermined boring position while supporting the cutter 52 in a horizontally-held state.

In the present embodiment, as cutting means of the fluid pipe 1, a so-called hole saw is formed. However, the present invention is not limited to this but for example a cut-off tool, a wire saw, an end mill, etc. may be used. At that time, in a case where the cutting machine is a cut-off tool, a structure in which a sprocket, a chain, etc. is driven and rotated in the circumferential direction of the pipe, or in a case where the cutting machine is an end mill, a structure in which the casing 2 is moved in the axial direction or the circumferential direction may be adopted with the known methods. In the present embodiment, the fluid pipe 1 is cut off to be divided in the pipe axis direction. However, the present invention is not limited to this. The fluid pipe 1 may not be divided in the pipe axis direction but bored a part of a pipe wall.

Although not shown in FIGS. 1 to 4, a pair of on-off valves 9, 9 capable of discharging the fluid in the casing 2 to the outside is attached to end portions opposing in the horizontal direction of the branch portion 2*a* of the casing 2 while being separated from each other in the pipe axis direction (see FIG. 5, etc.) Thus, by opening these on-off valves 9, 9, it is possible to flush out chips generated at the time of cutting off the fluid pipe 1 by the cutter 52 to the outside together with the fluid. After cutting off the fluid pipe 1, a bypass pipe 9*a* providing communication between these on-off valves 9, 9 is placed over the on-off valves 9, 9. The on-off valve 9 for flushing out chips to the outside together with the fluid may be provided, for example, to the vertically lower side of the casing 2 or may be provided in the attachment flange cylinder 51.

When the fluid pipe 1 is cut off by the cutter 52, a coupon cut out of the fluid pipe 1 are held in the cutter 52. By pulling the cutter 52 into the attachment flange cylinder 51 together with the coupon and closing the branch portion 2*a* by the valve element of the process valve 4, a cut-off task of the fluid pipe 1 is completed. After detaching the cutting machine 5, a known chips collecting sweeper may be attached to the process valve 4 and by utilizing pipe inner pressure or pump suctioning, a cleaning task of an inner surface of the casing 2 by a pipe may be performed.

Figure 3A:
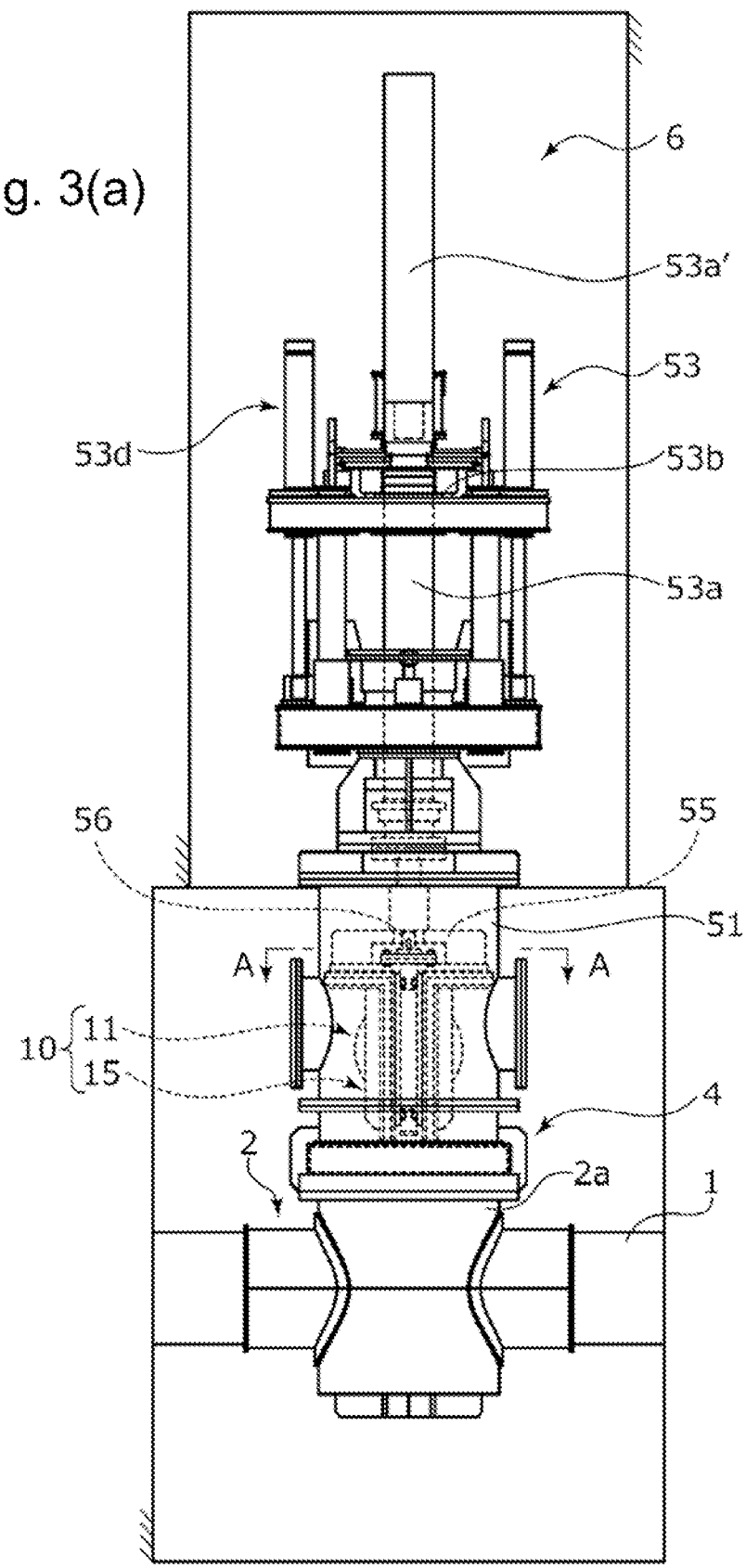
FIG. 3A is a plan view showing a state where an inserting machine including a fluid control body is attached to the casing.
Figure 3B:
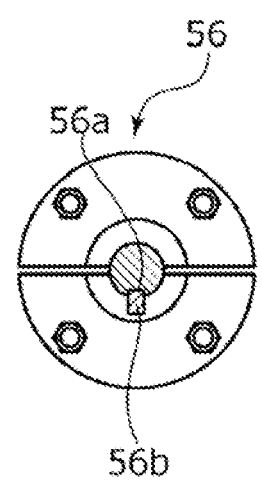
FIG. 3B is a sectional view by the line A-A of FIG. 3A.
Figure 4:
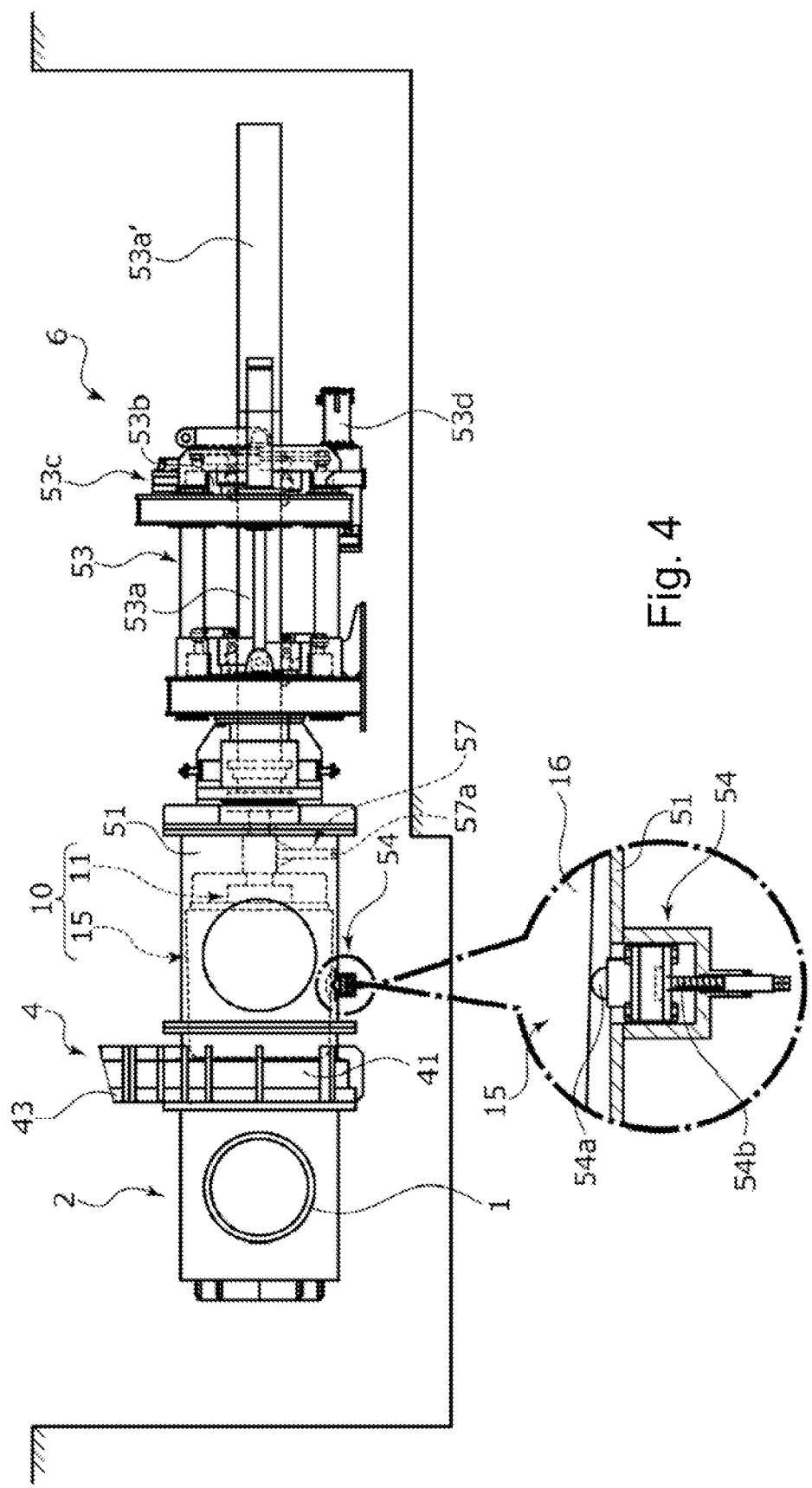
FIG. 4 is a side view as well as FIG. 2.
Figure 5:
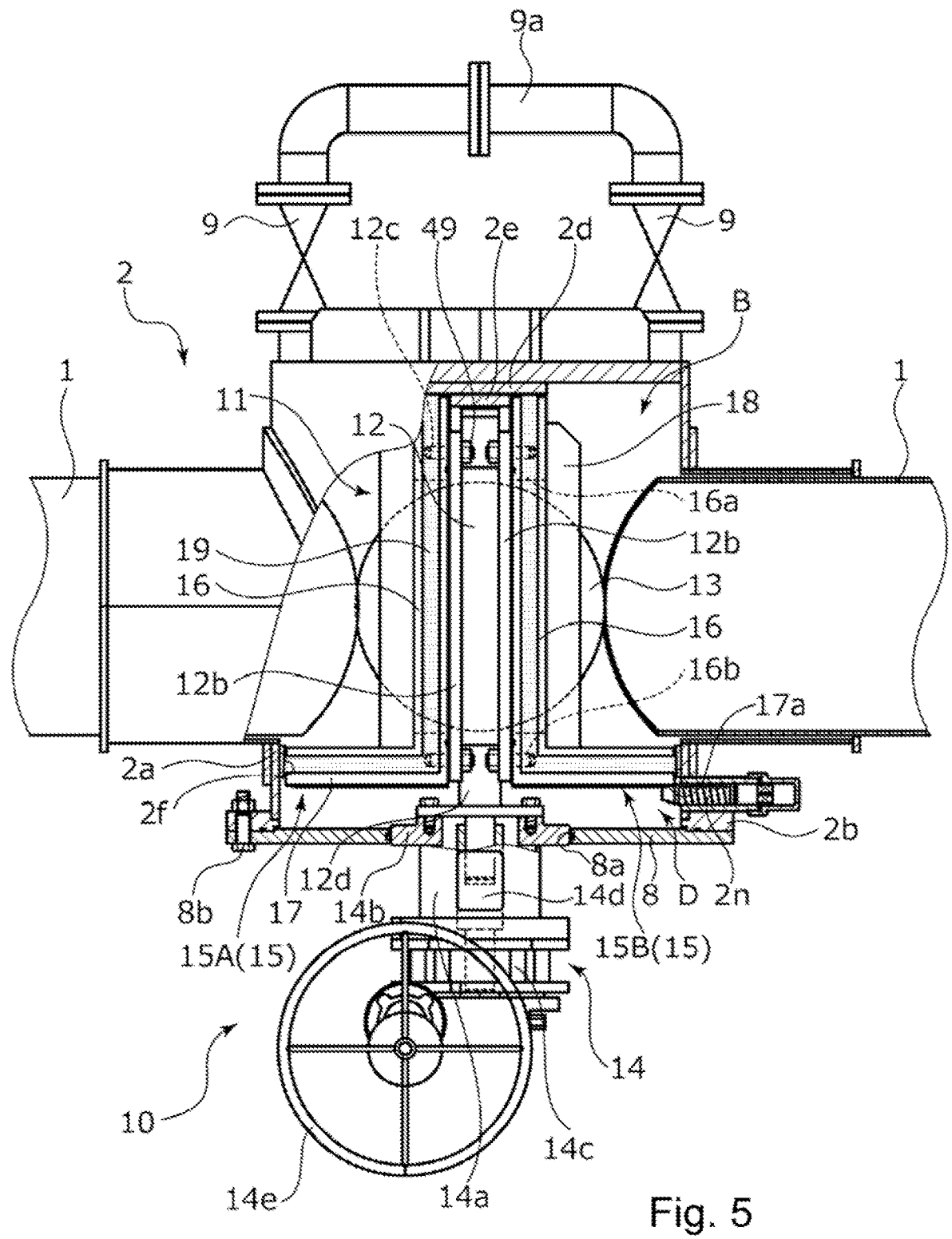
FIG. 5 is a partially sectional plan view showing a state where the fluid control body of the first embodiment is installed in the casing.

Next, as shown in FIGS. 3 and 4, a step of installing the fluid control body 10 in an uninterrupted flow state at the point where the fluid pipe 1 is cut off in the casing 2 will be described. First, while in a state where the branch portion 2*a* is closed by the valve element of the process valve 4, the inserting machine 6 to which the fluid control body 10 is connected is attached to an outside portion of the process valve 4 in a sealed state. The inserting machine 6 of the present embodiment is formed mainly by the attachment flange cylinder 51 formed to pass through in the horizontal direction, the attachment flange cylinder inside which the fluid control body 10 is arranged, and the drive mechanism 53 for moving this fluid control body 10 in the horizontal direction. That is, the inserting machine 6 of the present embodiment is formed by part of the members forming the cutting machine 5 described above. However, the present invention is not limited to this but members different from the cutting machine 5 may be used.

Next, as shown in FIGS. 5 to 10, the fluid control body 10 according to the present embodiment and an assembling step thereof will be described. The fluid control body 10 is formed mainly by a butterfly valve 11 serving as an on-off valve which is a versatile standardized or commercialized product, and partition bodies 15 mounted on this butterfly valve 11 by connection tools 49 such as bolts.

Further, as shown in FIGS. 5 to 9, the butterfly valve 11 includes a valve seat body 12 formed to have an opening in which an opening portion 12a formed in a substantially circular shape in a front view passes through front and back surfaces, a valve element 13 pivotally supported in the valve seat body 12 in such a manner that this opening portion 12a can be opened or closed in a sealed manner, that is, openable/closable, and a valve shaft at a side end of the valve seat body 12, an attachment flange, and an operation portion 14 formed by a cylinder body surrounding the valve shaft, etc. for operating this valve element 13 to open/close, the operation portion being coupled to an operation shaft 12d. These major parts are standardized or commercial products made of cast iron which is suitable for mass-production in the present embodiment. Further, coating and materials of the parts are also standardized or commercial products having specifications suitable for mass-production and regions where the parts are used. A pair of flange portions 12b, 12b is provided on the front and back sides of the valve seat body 12 to enclose the opening portion 12a in the circumferential direction. Further, plural bolt holes 12c are formed to pass through this flange portion 12b along the circumferential direction. Therefore, with this butterfly valve 11, this flange portion 12b and a flange of the fluid pipe (not shown) can be connected by bolts. For example, the butterfly valve 11 is widely applicable to water supply pipes, sewer pipes, submarine pipes, and various fluid pipes of shipbuilding yards, electric power plants, etc. The opening portion 12a of the butterfly valve 11 applied in the present embodiment is arranged substantially concentrically to the center of the fluid pipe 1, and has the approximately same opening diameter as an inner diameter of the fluid pipe 1. The valve element 13 of the present embodiment is turnable around the operation shaft 12d arranged in the substantially horizontal direction at a position of substantially-center height of the fluid pipe 1. Connection of the butterfly valve 11 to the fluid pipe is not limited to flange connection but may have a structure in which connection is made to have male/female fitting, for example.

By having a water re-filling hole in a valve wing portion of the valve element 13 and having the valve element 13 of a small opening degree, the butterfly valve 11 is preferably a water re-filling type butterfly valve with which the fluid can safely pass through to the downstream side while controlling the fluid by a small amount by the water re-filling hole. By doing so, the bypass pipe 9a providing communication between the upstream side and the downstream side of the valve is eliminated unlike the present embodiment, so that it is possible to downsize and simplify the casing. Valves other than the water re-filling type valve are also applicable as a matter of course.

In the present embodiment, the butterfly valve 11 is shown as the on-off valve. However, the present invention is not limited to this but the on-off valve may be a sluice valve, a ball valve, or a switching valve, etc.

Next, the partition bodies 15 have a divided structure in which a pair of partition bodies 15A, 15B is attached to the flange portions 12b of the valve seat body 12 of the butterfly valve 11 on the front and back sides in the pipe axis direction. The partition bodies 15 are mounted and fixed by the connection tools 49 inserted through the bolt holes 12c of the flange portions 12b.

Figure 8:
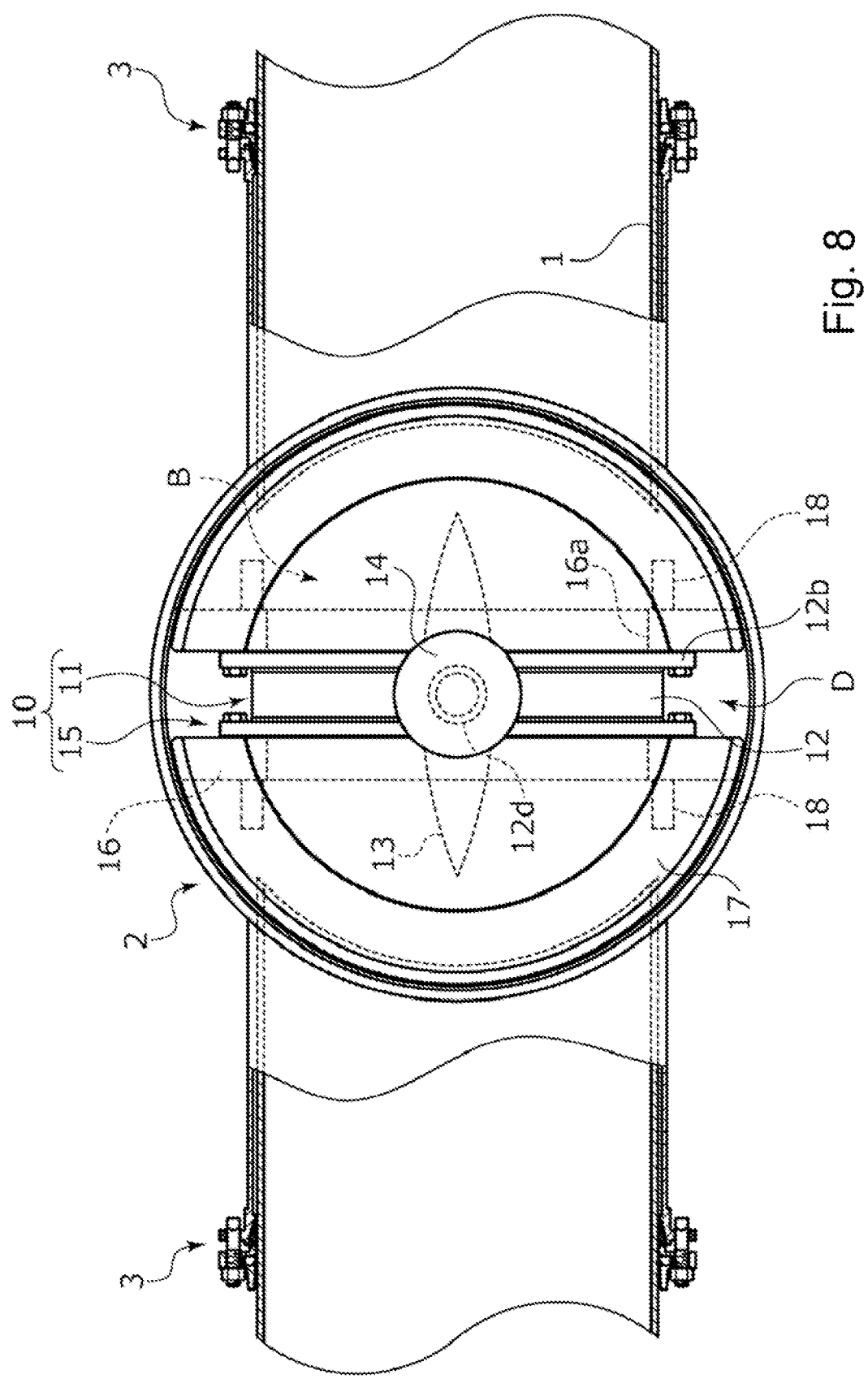
FIG. 8 is a partially sectional front view as well as FIG. 7.
Figure 9A:
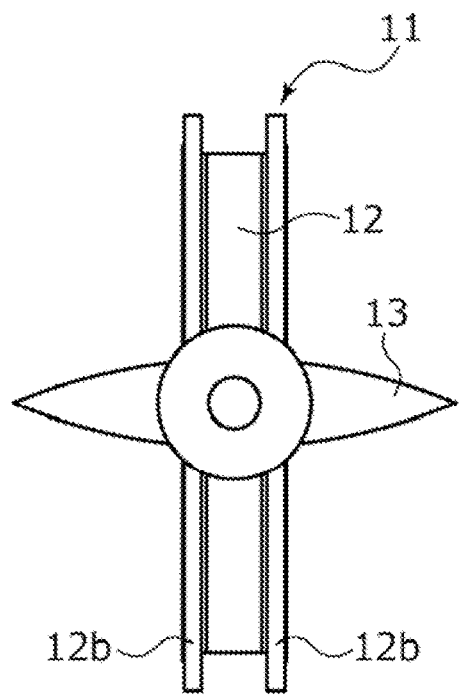
FIGS. 9(a), 9(b) and 9(c) are views showing a butterfly valve forming the fluid control body.
Figure 9B:
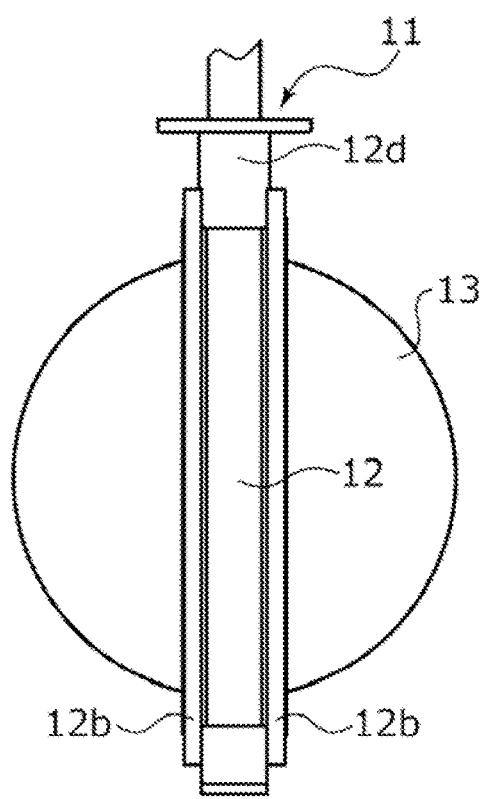
Figure 9C:
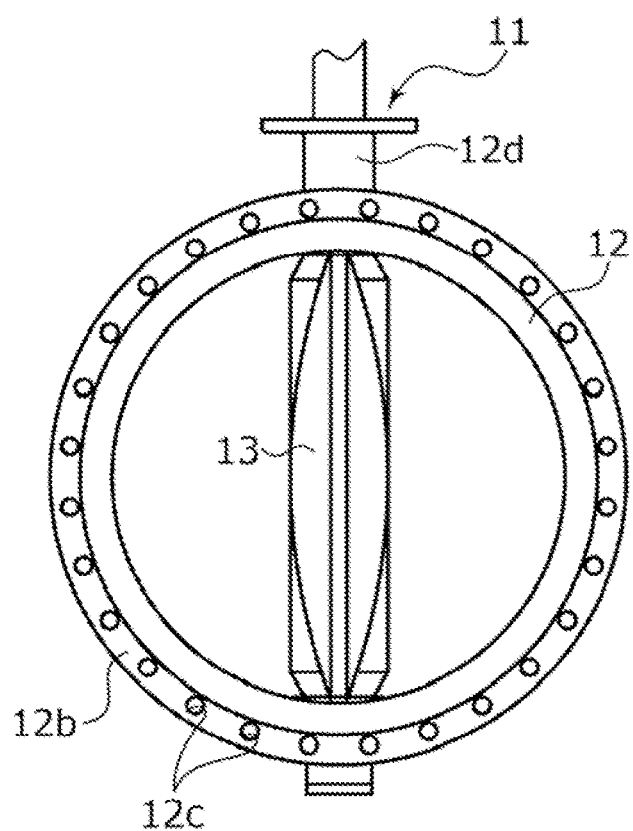
Figure 10A:
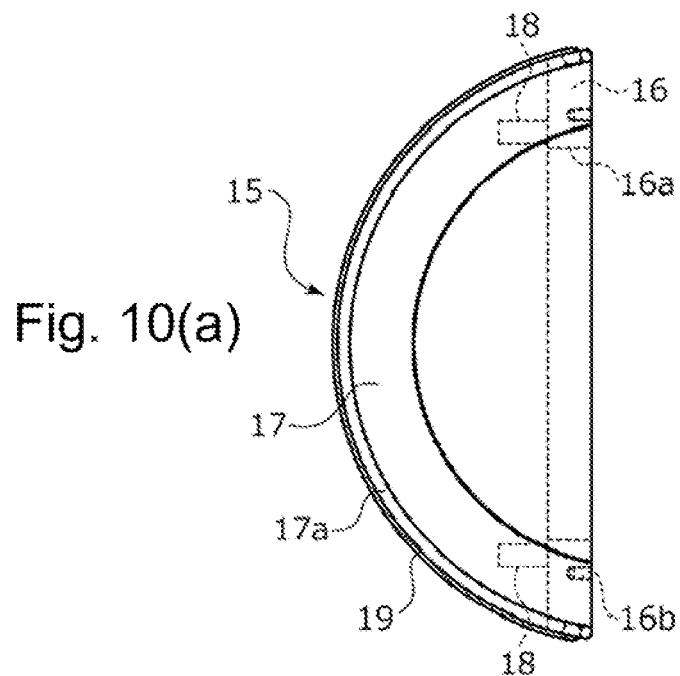
Figure 10:
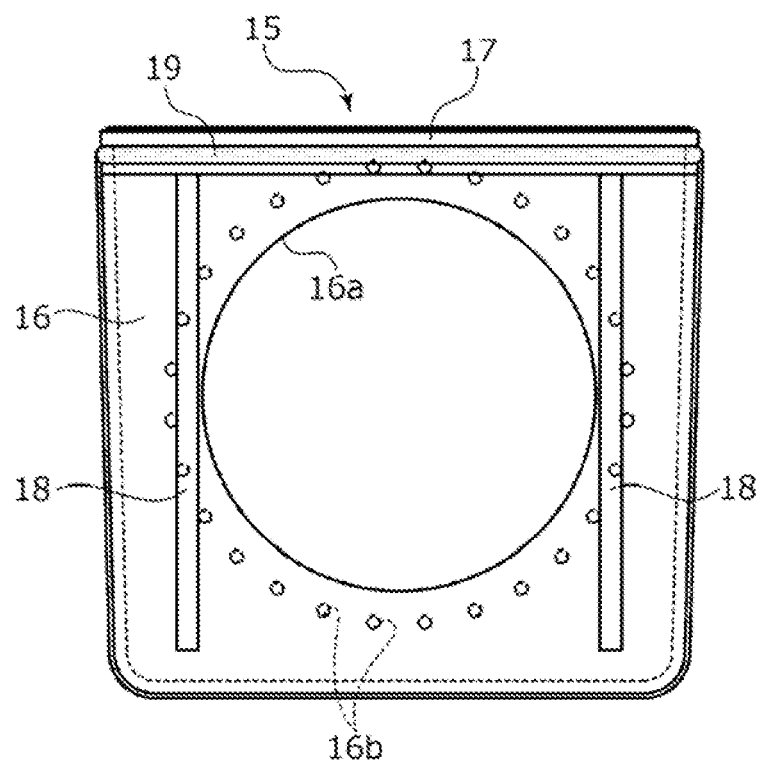
FIG. 10 (a) is a front view.
Figure 10:
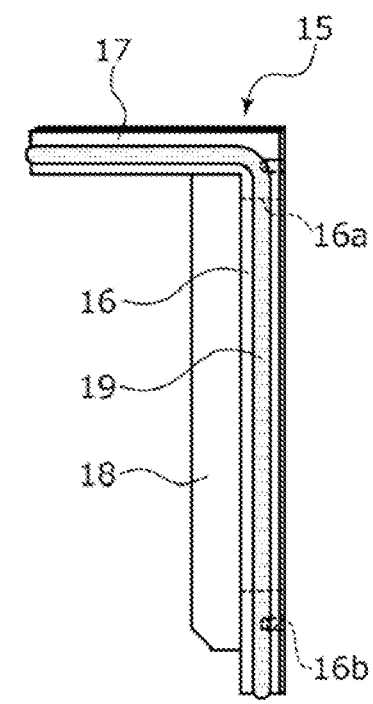

In more detail, as shown in FIGS. 5, 8, and 10, the partition bodies 15 are formed by the pair of integrated steel partition components provided in the pipe axis direction, each of the steel components including a wall portion 16 in which a through hole 16a communicating with the opening portion 12a of the butterfly valve 11 substantially concentrically with the approximately same diameter is formed to pass through, and plural bottomed female screw holes 16b are provided around this through hole 16a, and a lid portion 17 provided continuously to this wall portion 16 along the circumferential direction of an inner peripheral surface of the branch portion 2a positioned in a side portion of the casing 2. This wall portion 16 has a shape extending outward with respect to the valve seat body 12 of the butterfly valve 11, and is provided at a position eccentric to one side with respect to the center of the lid portion 17. This lid portion 17 is arranged to cover the branch portion 2a in the substantially vertical direction.

As shown in FIGS. 10(a), 10(b) and 10(c), by providing and fixing rib components 18 over the wall portion 16 and the lid portion 17 on both the left and right sides across the through hole 16a, rigidity of the whole partition body 15 is enhanced and a flow of the fluid when the opening portion 12a is opened is guided.

In the partition body 15, a groove portion formed in a substantially U shape in a sectional view is continuously formed over an outer side surface of the wall portion 16 and an outer peripheral surface of the lid portion 17, and an endless seal component 19 is arranged in this groove portion. Further, on the inner peripheral side of the connection tools 49 inserted through the flange portion 12b of the valve seat body 12, although not limited only to the inner peripheral side, an annular sealing member (not shown) is placed between an end surface of the valve seat body 12 in the pipe axis direction and a wall surface of the wall portion 16 opposing this end surface to enclose the opening portion 12a. The seal component 19 and the sealing member are made of elastic members of rubber, elastomer, resin, etc. including NBR, SBR, CR.

As described above, the fluid control body 10 is formed by the assembling step of assembling the butterfly valve 11 and the partition bodies 15 into each other. However, this assembling step of the fluid control body 10 may be performed at least before the installment step of installing the fluid control body 10 in the casing 2 to be described later, or may be performed before the cut-off step of the fluid pipe 1 or after the cut-off step.

Next, the installment step of installing the fluid control body 10 in the casing 2 will be described. As shown in FIGS. 3 and 4, a valve suspending tool 55 coupled to the drive mechanism 53 is connected to a rear end of the fluid control body 10 formed by the butterfly valve 11 and the partition bodies 15 described above by bolts (not shown), and the fluid control body 10 is inserted in the horizontal direction to the point where the fluid pipe 1 is cut off in the casing 2 by the drive mechanism 53.

As shown in FIG. 3B, between the fluid control body 10 and for example the valve suspending tool 55 or the butterfly valve 11, a rotation regulating portion 56 of a divided structure including a key groove 56a and a fitting portion of a key portion 56b is detachably provided. Thus, the fluid control body 10 is connected to the shaft member 53a in a state where turn of the valve element 13 of the butterfly valve 11 is regulated to maintain a fully-opened state.

As shown in FIG. 4, by slidably supporting the fluid control body 10 by using the load receiving portion 54 as described above, it is possible to precisely install the fluid control body 10 at the predetermined position while supporting the fluid control body 10 in a horizontally-held state. At this time, the roller portion 54a supports the fluid control body 10 in contact with the fluid control body 10. Thus, it is preferable that a rail extended substantially horizontally between the partition bodies 15A, 15B is provided in each of the partition bodies 15A, 15B, and further, plural load receiving portions 54 are placed at positions opposing these rails. However, the single load receiving portion 54 may be provided.

Further, a load supporting portion 57 extended vertically downward, the load supporting portion including a rolling portion 57a at a lower end is provided in the valve suspending tool 55 coupled to the drive mechanism 53. By the rolling portion 57a smoothly moving along an inner surface of the attachment flange cylinder 51, the load supporting portion 57 slidably supports the fluid control body 10 in cooperation with the load receiving portion 54 described above, and can highly precisely guide the fluid control body 10 to an installment position in the substantially horizontal direction.

In such a way, the installment step of the first embodiment is a step of inserting and installing the fluid control body 10 to the inside of the casing 2 in the substantially horizontal direction. Thus, there is no need for arranging a jig for installing the fluid control body 10 on the vertically upper side. Therefore, it is possible to simplify a load bearing structure of a jig.

This installment step is a step of installing the fluid control body 10 by using the plural shaft members 53a, 53a', . . . attached to and detached from each other in the installment direction of the fluid control body 10 as described above. Thus, it is possible to compactify a jig for installing the fluid control body 10 and a work region.

Figure 6:
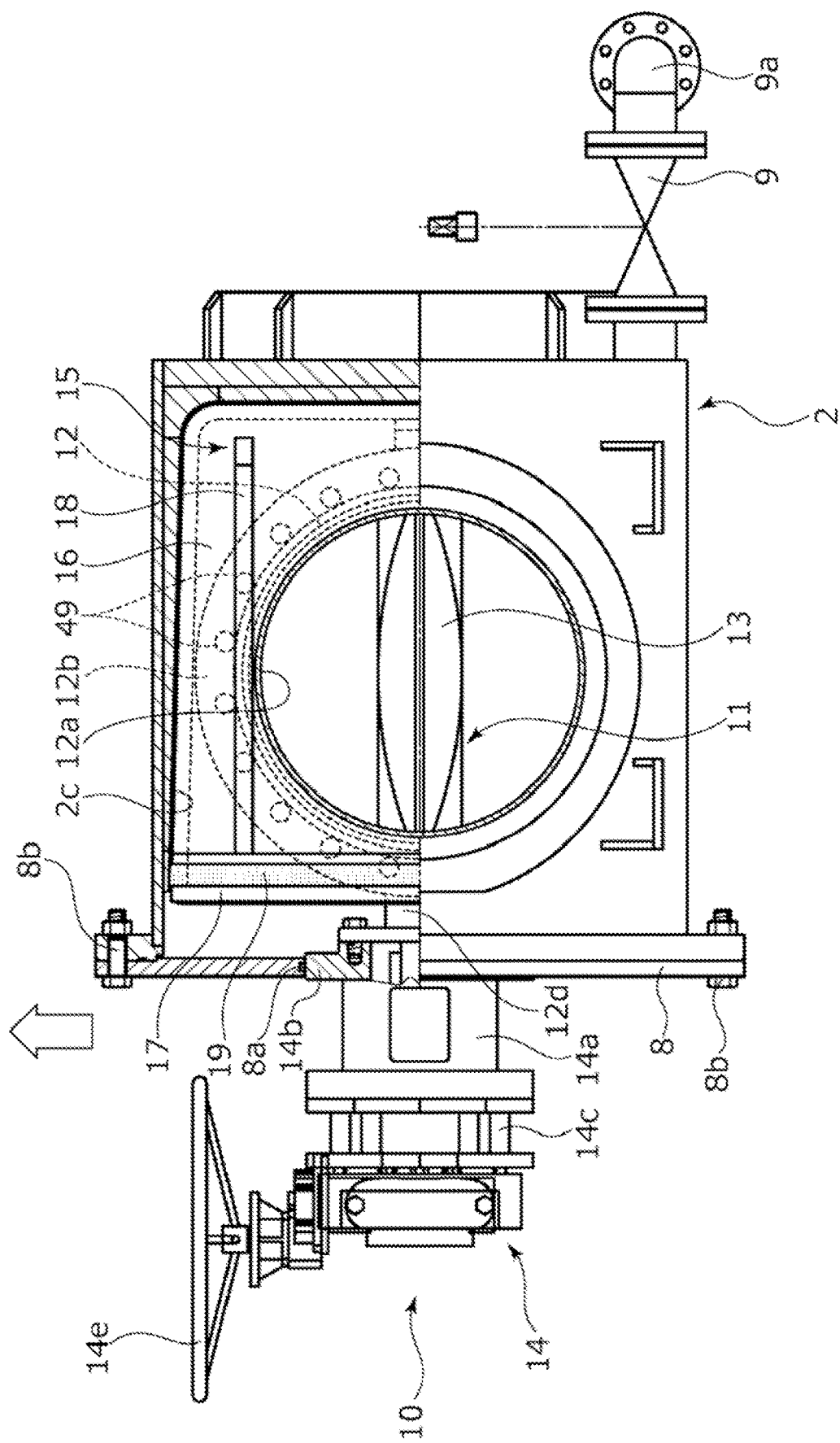
FIG. 6 is a partially sectional side view as well as FIG. 5.

Next, the inside of the casing 2 where the fluid control body 10 is installed will be described. As shown in FIG. 6, wall step portions 2c, 2c serving as seal seat portions which project to the inner side of the casing 2 with respect to the other parts are formed to oppose each other on upper and lower inner wall surfaces of the casing 2. This wall step portion 2c is extended to oppose the seal component 19 described above in a tapered shape to gradually come close to each other to the far side in the insertion direction from the branch portion 2a. Therefore, at the time of inserting the fluid control body 10 into the casing 2, the fluid control body 10 is inserted into the casing 2 in a separated state where the seal component 19 provided in the wall portion 16 is close to the wall step portion 2c. At the same time as the fluid control body 10 is installed in the casing 2, the seal component 19 is compressed to the wall step portion 2c. The wall step portions 2c, 2c are not limited to projection forming but may be flush with another inner surface without projecting or be a recessed portion.

As shown in FIG. 5, at the time of inserting the fluid control body 10 into the casing 2 by predetermined length in the substantially horizontal direction, leading end portions of the seal components 19 provided in the wall portions 16 are compressed to a far-side wall step portion 2d serving as a seal seat portion which is formed to project on a far-side end surface in the insertion direction of the fluid control body 10 inside the casing 2, and leading end portions of the wall portions 16 of the pair of partition bodies 15 provided to sandwich the butterfly valve 11 in the pipe axis direction are fitted to a projected portion 2e projecting sideward in the center of the far-side wall step portion 2d of the casing 2 while leaving some allowance. Thereby, it is possible to prevent inclination of the fluid control body 10 with respect to the casing 2 at the time of an insertion task and after insertion, and it is possible to maintain a sealing property against pressure fluctuation and flow rate fluctuation of a fluid in a pipe. The projected portion 2e may be extended on one of or both the members of the divided structure to the branch portion 2a of the casing 2 to guide at the time of inserting the fluid control body 10. Further, although not particularly shown in the figures, the projected portion 2e described above may not specifically be provided but only the far-side wall step portion 2d may be provided. At the time of inserting the fluid control body 10 into the casing 2 by predetermined length, the seal components 19 provided in the lid portions 17 are compressed to a peripheral wall step portion 2f serving as a seal seat portion which projects inward of the branch portion 2a. The far-side wall step portion 2d and the peripheral wall step portion 2f are not limited to projection forming but may be flush with another inner surface without projecting or be a recessed portion.

In such a way, since the wall step portions 2c and the far-side wall step portion 2d serving as the seal seat portions project on the inner surface of the casing 2, it is possible to suppress the chips generated at the time of cutting off the fluid pipe from adhering to the seal seat portions. Thus, it is possible to improve the sealing property and the structure is more preferable.

At the time of the installment step of the fluid control body 10, by bringing the valve element 13 into an opened state and bringing both the on-off valves 9, 9 into an opened state, it is possible to maintain an uninterrupted flow state without stopping a flow of the fluid at the time of installing the fluid control body 10. As described above, rotation of the valve element 13 is regulated by the rotation regulating portion 56 to maintain an opened state.

Next, plural fixing screws 2n provided in the circumferential direction of the branch portion 2a of the casing 2, the fixing screws being capable of going forward and backward in the radial direction go forward in the inner diameter direction of the branch portion 2a. Thereby, the fixing screws 2n hold the lid portion 17 to press from the outer side against fluid pressure in the casing 2, and the fluid control body 10 is prevented from drawing out of the branch portion 2a. Leading end portions of the fixing screws 2n are formed in a tapered shape, and the leading end portions of the fixing screws 2n are brought into sliding contact with an inclined surface 17a formed in an outer peripheral edge of an outer surface of the lid portion 17. Thus, it is possible to correct inclination of the lid portion 17, that is, of the fluid control body 10 to some extent.

By pressing the lid portion 17 from the outer side by the fixing screws 2n in such a way, it is possible to detach the inserting machine 6 formed by the attachment flange cylinder 51 and the drive mechanism 53, the valve suspending tool 55, and the process valve 4 from the casing 2.

By installing the fluid control body 10 in the casing 2 in such a way, by the seal components 19 provided in the fluid control body 10 and the sealing member described above, the inside of the casing 2 is partitioned into an inside region B communicating with the inside of the fluid pipe 1 and forming a flow passage, and an outside region D excluding this inside region B in a sealed manner. By detaching the inserting machine 6, the process valve 4, etc. as described above, inside the casing 2, the fluid of the outside region D is discharged to the outside of the casing 2. In a case where some fluid remains, the fluid may be suctioned and removed by a pump (not shown) to make the outside region D a void space where no fluid in a pipe exists. By doing so, even in a case where for example a standardized or commercialized product is used straightaway as the butterfly valve 11, and even with standardized coating, the butterfly valve 11 is brought into contact with the fluid in the pipe only in time which is the time of inserting, and after insertion, installed in the casing 2 in a dry state and in a state where the butterfly valve 11 is protected from contact with heavy machineries. Thus, corrosion resistance, accident prevention, and leakage prevention are excellent. The butterfly valve 11 may be arranged in the outside region D while coating of a part of the butterfly valve 11 to be in contact with the fluid may be changed to coating suitable for the fluid.

Figure 7:
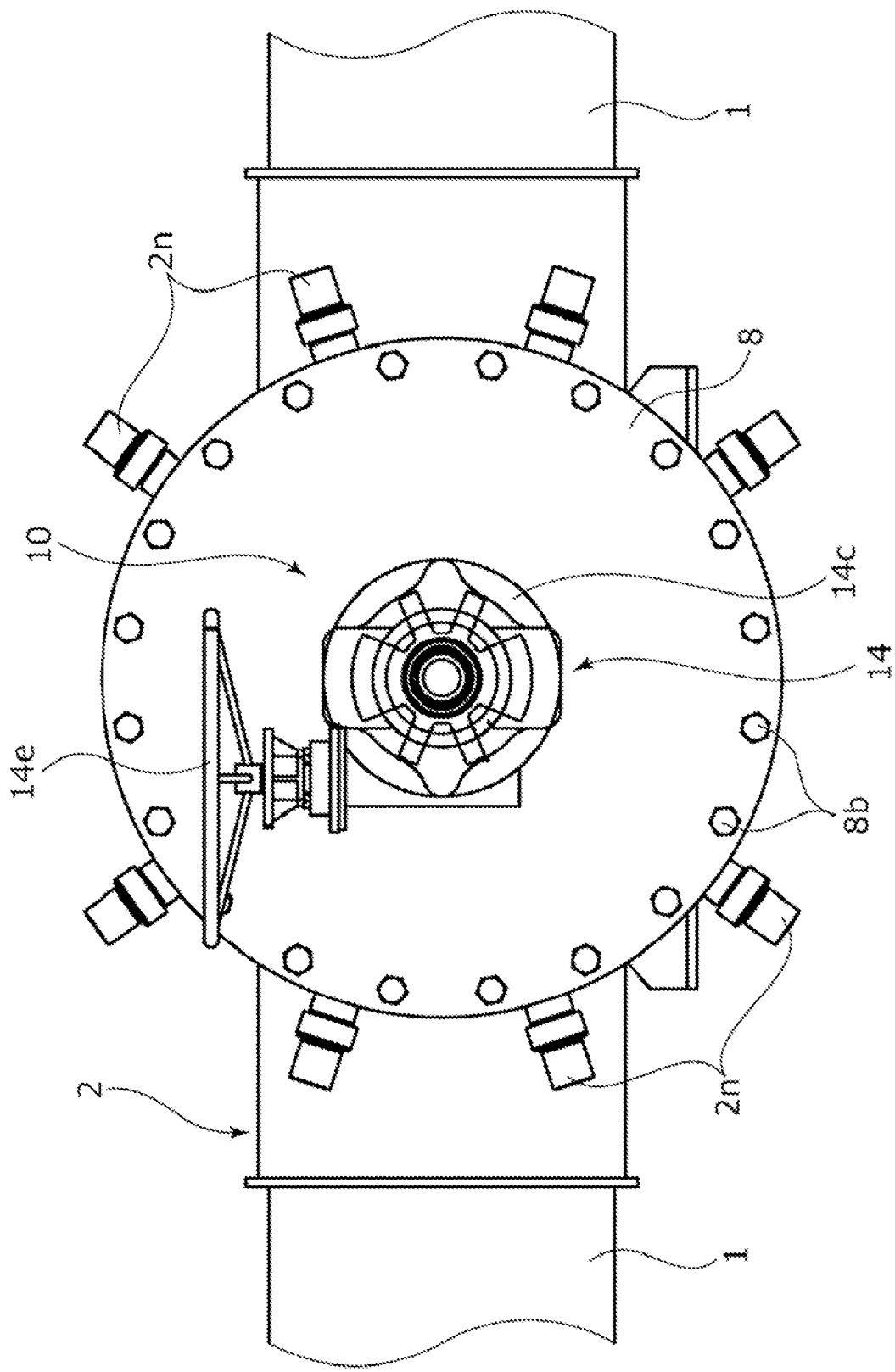
FIG. 7 is a front view as well as FIG. 5.

Next, as shown in FIGS. 5 to 7, the rotation regulating portion 56 is detached at an appropriate time, and an annular lid member 8 having an integrated or divided structure in which a through hole 8a is formed in the center is fixed to the flange 2b of the branch portion 2a in a sealed manner by a bolt-nut 8b. In the lid member 8, an extending portion 14b extending from a main body portion 14a of the operation portion 14 of the fluid control body 10 is inserted through the through hole 8a, and a sealing ring that seals a part from the extending portion 14b of the operation portion 14 is provided, so that the lid member 8 preferably prevents the fluid control body 10 from drawing out of the branch portion 2a together with the fixing screws 2n. Next, a speed reducer 14c of the operation portion 14 arranged on the outer side of the casing 2 and the operation shaft 12d of the valve seat body 12 forming the butterfly valve 11 are relatively non-turnably coupled and fixed to each other via a coupling body 14d. An operation ring 14e capable of operating to turn the operation shaft 12d of the valve seat body 12 via the coupling body 14d is attached to the speed reducer 14c of the operation portion 14. That is, by operating to turn on the operation axis arranged in the substantially vertical direction, the operation ring 14e transmits turning force to the operation shaft 12d arranged in the substantially horizontal direction inside the casing 2 via the speed reducer 14c, so that the valve element 13 can be operated to open/close. Thereby, installment of the fluid control body 10 into the casing 2 is completed.

In such a way, with the installment method of the fluid control body 10 and the fluid control device including the fluid control body 10 according to the present invention, as the fluid control body 10 installed in the casing 2 which is fitted onto the fluid pipe 1 in a sealed manner, the butterfly valve 11 (on-off valve) formed by the valve seat body 12 and the valve element that opens/closes the opening portion 12a, and the partition bodies 15 formed by the wall portions 16 which are mounted on the valve seat body 12 and the lid portions 17 covering an opening of the casing 2 on the branch portion 2a side, the partition bodies including the seal components 19 that seal parts from the inner surface of this casing 2 are formed separately from each other. Thus, without requiring a fluid control body whose details are designed and manufactured according to a shape of the casing 2, it is possible to adopt a standardized or commercialized product which is highly versatile as the butterfly valve 11 (on-off valve) and has desired fluid control properties, and also to hold the sealing property in the casing 2 by the partition bodies 15 placed between this butterfly valve 11 and the inner surface of the casing 2. The partition bodies 15 are formed by the wall portions 16 enclosing the opening portion 12a of the valve seat body 12 and the lid portions 17 provided continuously to the wall portions 16. Thus, structural strength and rigidity of the partition bodies 15 are enhanced and it is possible to maintain the sealing property against pressure fluctuation and flow rate fluctuation of the fluid in the pipe.

Further, the fluid control body 10 is installed in a state where the operation shaft 12d of the butterfly valve 11 is placed in the direction different from the vertical direction. Thus, it is possible to provide the fluid control body 10 with which such high versatility that installment can be made irrespective of a laid environment of a fluid pipeline such as earth covering of the fluid pipe 1 and desired control properties are provided. In addition, in a case where the fluid control body 10 includes the butterfly valve 11 serving as the on-off valve, the operation shaft 12d is different from the vertical direction. Thus, it is also possible to suppress a possibility that foreign substances remain on the bottom surface side of the inner surface of the casing 2.

The main body portion 14a of the operation portion 14 extends in the substantially horizontal direction which is the direction different from the substantially vertical direction with respect to the casing 2, and there is no part projecting to the vertically upper side of the casing 2. Thus, there is no restriction on embedding height of a pipeline of the already-installed fluid pipe 1, and it is possible to apply to for example a fluid pipeline having small depth of earth covering and it is possible to enhance versatility. In the present embodiment, the operation shaft 12d of the butterfly valve 11 and the main body portion 14a of the operation portion 14 extend in the substantially horizontal direction. However, as long as the direction is different from the substantially vertical direction, the present invention is not limited to this. For example, the operation shaft 12d and the main body portion 14a may extend in the direction inclined with respect to the substantially vertical direction.

At the time of an assembling step of assembling the fluid control body 10 by the butterfly valve 11 (on-off valve) and the partition bodies 15, by letting the pair of wall portions 16, 16 approach to sandwich the valve seat body 12 of the butterfly valve 11 in the pipe axis direction, it is possible to easily mount these wall portions 16, 16.

Further, by letting the lid portions 17, 17 provided respectively continuously to the pair of wall portions 16, 16 approach in the pipe axis direction, it is possible to easily form as the partition bodies 15.

By endlessly sealing over the inner surface of the casing 2 and the inner peripheral surface on the branch portion 2a side with the seal components 19 provided in the fluid control body 10, it is possible to enhance the sealing property and avoid a possibility of fluid leakage.

By placing the sealing member that seals to enclose the opening portion 12a between the valve seat body 12 and the wall portions 16, it is possible to block a flow of the fluid between the valve seat body 12 and the wall portions 16 by this sealing member. By installing the fluid control body 10 in the casing 2, it is possible to prevent corrosion in a part (such as an outer peripheral part of the flange portions 12b of the butterfly valve 11) coming into contact with the outside region D excluding the inside region B formed as a flow passage.

In order to remove the fluid remaining in the outside region D, the present invention is not limited to the description above. For example, a drain flow passage communicating with the outside region D and the outside of the casing 2 may be formed at a predetermined point of the casing 2, a valve that opens/closes this drain flow passage may be attached, and the fluid remaining in the outside region D may be discharged to the outside of the casing 2 via the drain flow passage by opening this valve.

Next, a first modified example of the fluid control body will be described with reference to FIGS. 11 to 12. The same configurations as the embodiment described above will not be repeatedly described.

Figure 11:
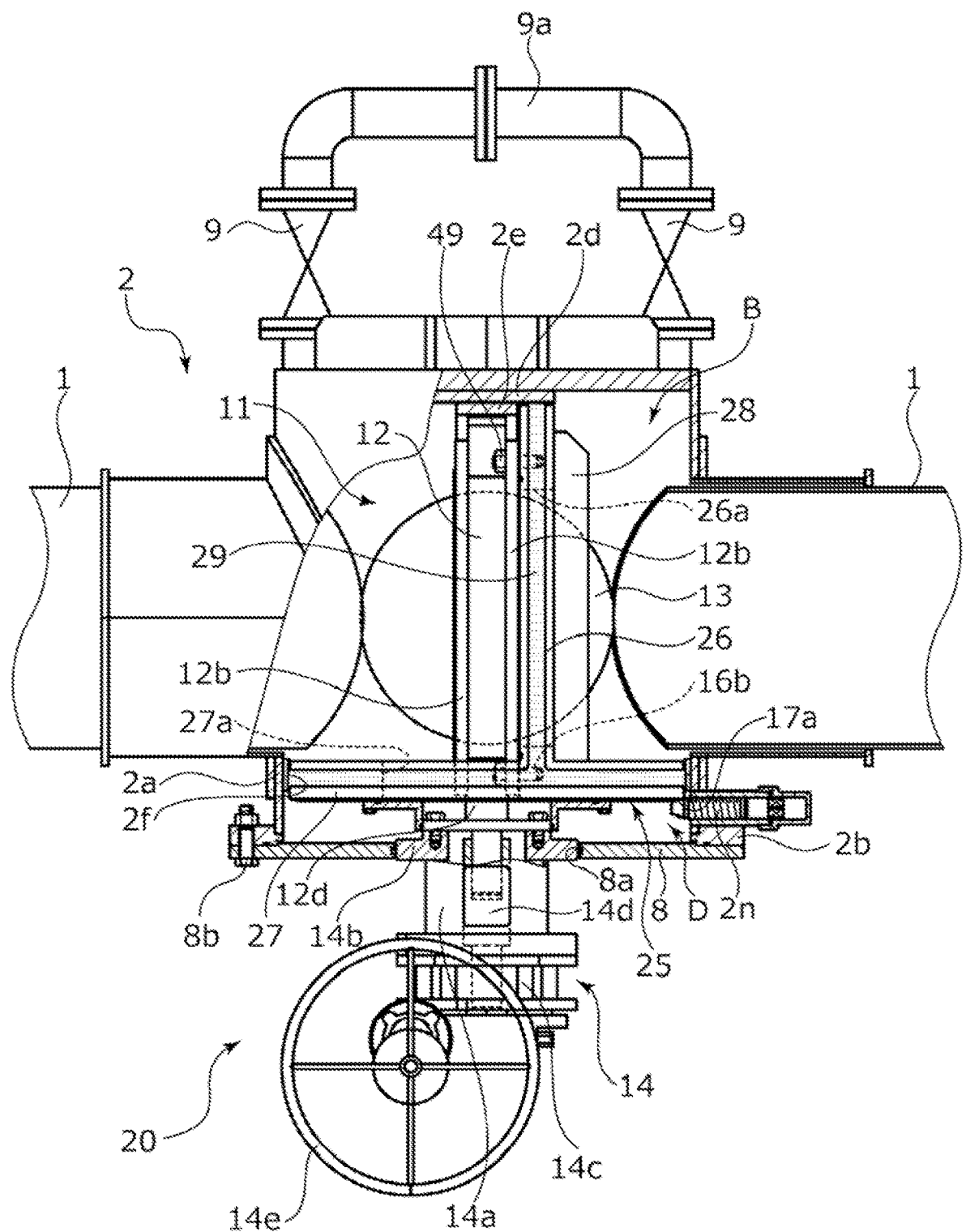
FIG. 11 is a partially sectional plan view showing a fluid control body of a first modified example of the first embodiment.

As shown in FIG. 11, in a fluid control body 20 of the first modified example, a partition body 25 having a different shape from the partition bodies 15 of the first embodiment described above is mounted on the butterfly valve 11 described above.

In more detail, as shown in FIG. 11, the partition body 25 is formed by an integrated steel component including a wall portion 26 in which a through hole 26a arranged substantially concentrically to the opening portion 12a of the butterfly valve 11 with the approximately same diameter as that of the opening portion 12a is formed to pass through, the wall portion including plural bottomed female screw holes 26b around this through hole 26a, and a lid portion 27 provided continuously to this wall portion 26, the lid portion having a substantially circular outer shape provided along and over the entire circumference of the inner peripheral surface of the branch portion 2a of the casing.

This wall portion 26 has a shape extending outward and toward the far side with respect to the valve seat body 12 of the butterfly valve 11, and is provided at a position eccentric to one side with respect to the center of the lid portion 27. That is, the wall portion 26 is attached only to one end surface of the valve seat body 12 (end surface on the right side in the figure). The lid portion 27 includes a substantially circular axial hole 27a formed to pass through and have a larger diameter than that of the operation shaft 12d in a plan view at a point adjacent to the wall portion 26, that is, a position eccentric to the other side with respect to the center of the lid portion 27. The present invention is not limited to the wall portion 26 provided at the position eccentric with respect to the center of the lid portion 27 but the wall portion 26 may be provided at a center position of the lid portion 27.

As shown in FIGS. 11 and 12A, by providing and fixing rib components 28 over the wall portion 26 and the lid portion 27, rigidity of the whole partition body 25 is enhanced and a flow of the fluid when the opening portion 12a is opened is guided.

In the partition body 25, a groove portion formed in a substantially U shape in a sectional view is continuously formed over an outer side surface and a leading end surface of the wall portion 26 and an outer peripheral surface of the lid portion 27, and an endless seal component 29 is arranged in this groove portion. Further, on the inner peripheral side of the connection tools 49 inserted through the flange portion 12b of the valve seat body 12, although not limited only to the inner peripheral side, an annular sealing member (not shown) is placed between the end surface of the valve seat body 12 in the pipe axis direction and a wall surface of the wall portion 26 opposing this end surface to enclose the opening portion 12a. The seal component 29 and the sealing member are made of elastic members of rubber, elastomer, resin, etc. including NBR, SBR, CR.

Figure 12:
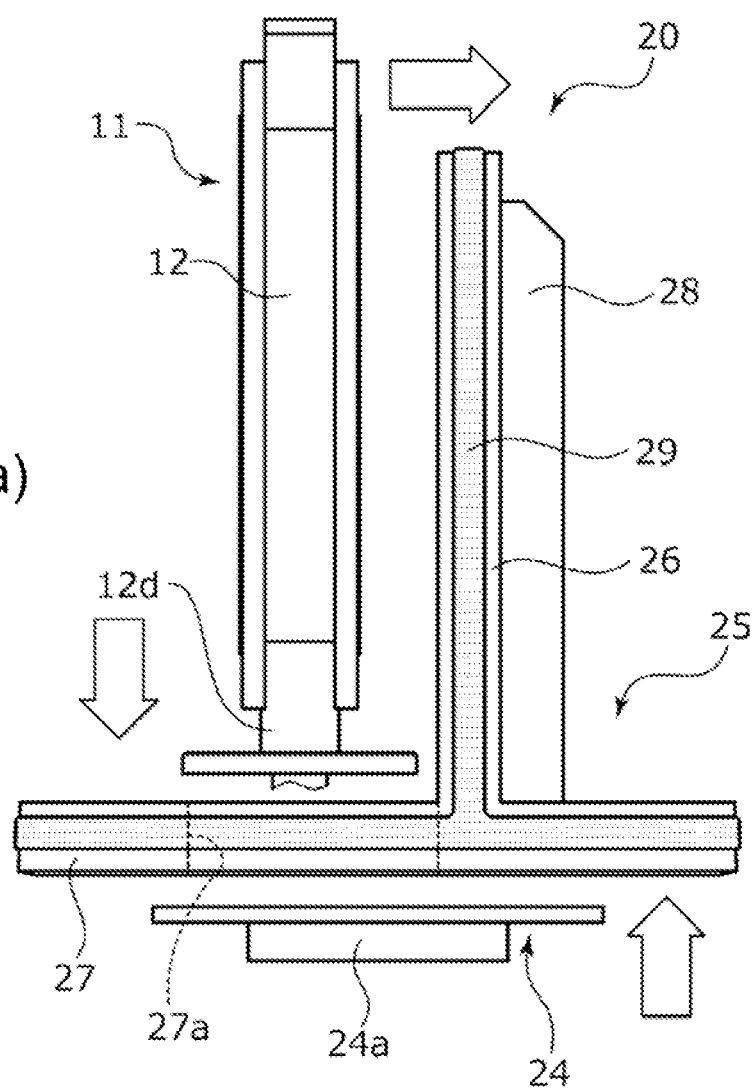
FIG. 12 (b) is a front view of a covering lid forming the fluid control body.
Figure 12:
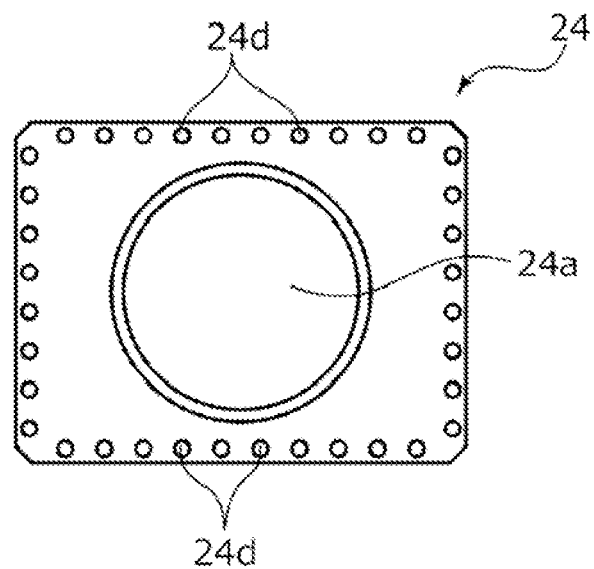

Next, as shown in FIG. 12 (a), a process of attaching the butterfly valve 11 and the partition body 25 will be described. First, the operation shaft 12d of the butterfly valve 11 in a state where the operation portion 14 is detached is inserted through the axial hole 27a from the lower side of the partition body 25. Then, the flange portion 12b of the valve seat body 12 and the wall portion 26 are abutted with each other and these are coupled to each other by the connection tools 49. Further, by a covering lid 24 formed in a rectangular shape in a front view, the covering lid including a through opening 24a in the center, the upper side of the axial hole 27a is covered in a sealed state. As shown in FIGS. 12A and 12B, the covering lid 24 is formed to seal an outer surface of the lid portion 27 by an endless seal component provided on a lower surface and to seal the operation shaft 12d of the butterfly valve 11 by an endless seal component provided on an inner peripheral surface of the through opening 24a, and attached to the outer surface of the lid portion 27 by attachment screws 24d.

Although not particularly shown in the figures, in a far-side end portion in the casing 2, in addition to the projected portion 2e projecting in the center of the far-side wall step portion 2d, a side end projected portion may be provided to project in a side end portion of the far-side wall step portion 2d. Between the projected portion 2e and the side end projected portion, a lower end portion of the wall portion 26 of the partition body 25 may be fitted while leaving some allowance. Thereby, it is possible to prevent inclination of the fluid control body 20 with respect to the casing 2 at the time of an insertion task and after insertion. The projected portion 2e and the side end projected portion may be extended on the branch portion 2a side of the casing 2 to guide at the time of inserting the fluid control body 20.

In such a way, by forming the partition body 25 by the wall portion 26 and the lid portion 27 integrated with and provided continuously to each other, it is possible to improve rigidity and a sealing property of the partition body 25.

By forming and sealing the axial hole 27a through which the operation shaft 12d is inserted in the lid portion 27 in such a way, it is possible to operate the valve element 13 in the casing 2 to open/close in a sealed state by the operation portion 14 connected to the operation shaft 12d which is inserted through to the outside of the casing 2 via the axial hole 27a. In a case of the first modified example, coating of the butterfly valve 11 is desirably changed to coating suitable for a fluid in a pipe.

Next, a second modified example of the fluid control body will be described with reference to FIGS. 13 (a), 13 (b) and 13(c). The same configurations as the embodiment described above will not be repeatedly described.

Figure 13A:
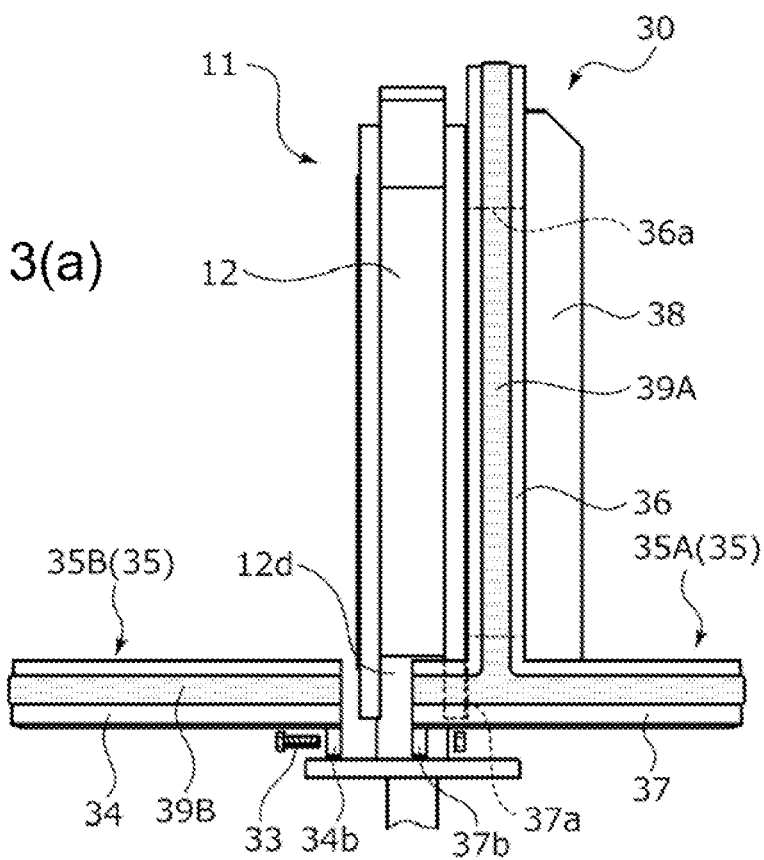
FIGS. 13(a) and 13(b) are views showing a fluid control body of a second modified example of the first embodiment.
Figure 13B:
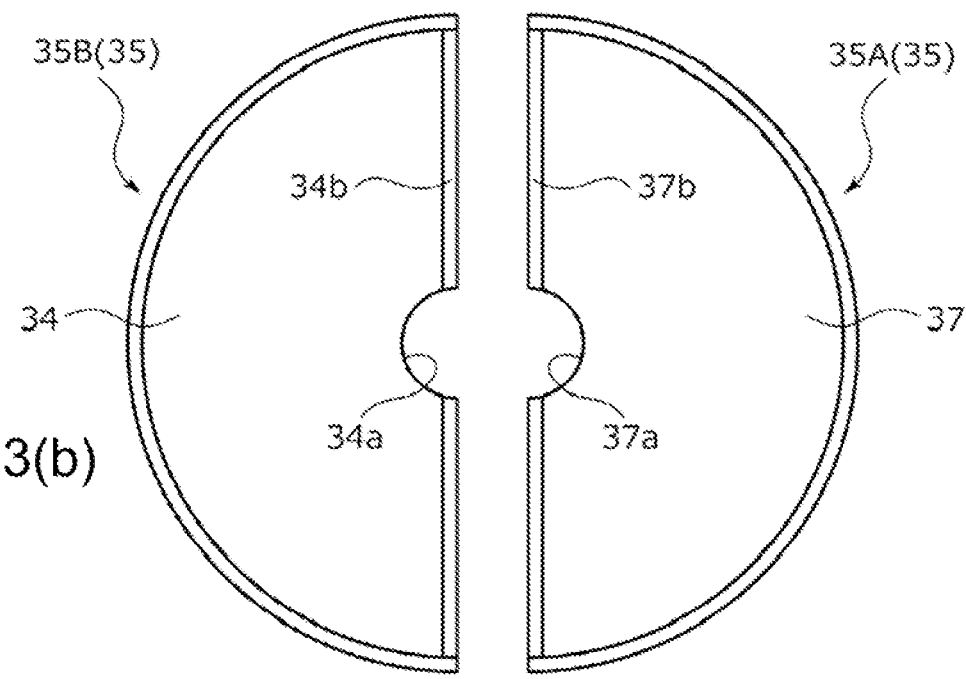

As shown in FIGS. 13(a), 13(b) and 13(c), in a fluid control body 30 of the second modified example, a partition body 35 having a different shape from the partition bodies 15, 25 described above is mounted on the butterfly valve 11 described above.

In more detail, the partition body 35 is formed by an integrated steel component 35A including a wall portion 36 in which a through hole 36a arranged substantially concentrically to the opening portion 12a of the butterfly valve 11 with the approximately same diameter as that of the opening portion 12a is formed to pass through, the wall portion including plural bottomed female screw holes 36b around this through hole 36a, and a lid portion 37 provided continuously to this wall portion 36, the lid portion being provided along substantially half the circumference of the inner peripheral surface of the branch portion 2a of the casing, and a steel component 35B which is a separate body from this steel component 35A, the steel component being formed by only a lid portion 34 which is provided along the remaining substantially-half circumference of the inner peripheral surface of the branch portion 2a of the casing. That is, the partition body 35 of the second modified example has a divided structure in which the lid portion 27 of the partition body 25 of the first modified example described above is formed by the lid portion 37 and the lid portion 34.

As shown in FIGS. 13(a), 13(b) and 13(c), the wall portion 36 of the steel component 35A has a shape extending outward and toward the far side with respect to the valve seat body 12 of the butterfly valve 11, and is provided at a position eccentric to one side with respect to the center of the lid portion 37. That is, the wall portion 36 is attached only to one end surface of the valve seat body 12 (end surface on the right side in the figure). The lid portion 37 includes a substantially semicircular cutout hole 37a formed to seal the operation shaft 12d for coupling the operation portion 14 of the butterfly valve 11 at a point adjacent to the wall portion 36, and a flange 37b for connecting to the lid portion 34 which is a separate body is formed in an end portion on the left side in the figure. The present invention is not limited to the wall portion 36 provided at the position eccentric with respect to the center of the lid portion 37 but the wall portion 36 may be provided at a center position of the lid portion 37.

By providing and fixing rib components 38 over the wall portion 36 and the lid portion 37, rigidity of the whole partition body 35 is enhanced and a flow of the fluid when the opening portion 12a is opened is guided.

In the steel component 35A forming the partition body 35, a groove portion formed in a substantially U shape in a sectional view is continuously formed over an outer side surface and a leading end surface of the wall portion 36 and an outer peripheral surface of the lid portion 37, and an endless seal component 39A is arranged in this groove portion. Further, on the inner peripheral side of the connection tools 49 inserted through the flange portion 12b of the valve seat body 12, although not limited only to the inner peripheral side, an annular sealing member (not shown) is placed between an end surface of the valve seat body 12 in the pipe axis direction and a wall surface of the wall portion 36 opposing this end surface to enclose the opening portion 12a.

Next, the lid portion 34 of the steel component 35B forming the partition body 35 includes a substantially semi-circular cutout hole 34a formed to seal the operation shaft 12d for coupling the operation portion 14 of the butterfly valve 11 on an end surface on the right side in the figure, and a flange 34b for connecting to the lid portion 37 which is a separate body is formed in an end portion on the right side in the figure.

In the steel component 35B, a groove portion formed in a substantially U shape in a sectional view is continuously formed over an outer peripheral surface of the lid portion 34, and an endless seal component 39B is arranged in this groove portion. The seal components 39A, 39B and the sealing member are made of elastic members of rubber, elastomer, resin, etc. including NBR, SBR, CR.

Next, as shown in FIGS. 13(a), 13(b) and 13(c), a process of attaching the butterfly valve 11 and the partition body 35 will be described. First, the operation shaft 12d of the butterfly valve 11 is abutted with the cutout hole 37a from one side of the steel component 35A forming the partition body 35, the flange portion 12b of the valve seat body 12 and the wall portion 36 are abutted with each other, and these are coupled to each other by the connection tools 49. Further, the steel component 35B forming the partition body 35 approaches toward the operation shaft 12d of the butterfly valve 11 from the other side, the operation shaft 12d is abutted with the cutout hole 34a, and an end surface of the steel component 35B is abutted with an end surface of the steel component 35A. That is, by the cutout hole 34a and the cutout hole 37a, an axial hole through which the operation shaft 12d is inserted is formed.

Further, as shown in FIG. 13 (a), by fastening tools 33 inserted through the flange 34b of the lid portion 34 and the flange 37b of the lid portion 37, the lid portion 34 and the lid portion 37 are fastened. In this fastened state, the seal component 39A of the lid portion 34 and the seal component 39B of the lid portion 37 are abutted with each other and also abutted with the operation shaft 12d of the butterfly valve 11 to seal. Sealing members are placed between the lid portion 34 and the lid portion 37 and between the cutout hole 34a, the cutout hole 37a, and the operation shaft 12d, as a matter of course.

By letting the pair of lid portions 34, 37 approach to sandwich the operation shaft 12d for driving the valve element of the butterfly valve 11 in the pipe axis direction in such a way, it is possible not only to easily mount these lid portions 34, 37 but also, as the axial hole is formed by the cutout hole 34a and the cutout hole 37a, to align the pair of lid portions 34, 37 with respect to each other by utilizing the operation shaft 12d. In a case of the second modified example, coating of the butterfly valve 11 is desirably changed to coating suitable for a fluid in a pipe.

Second Embodiment

Next, an installment method of a fluid control body and a fluid control device including a fluid control body according to a second embodiment will be described with reference to FIGS. 14 to 23. The same configurations as the embodiment described above will not be repeatedly described.

Figure 16:
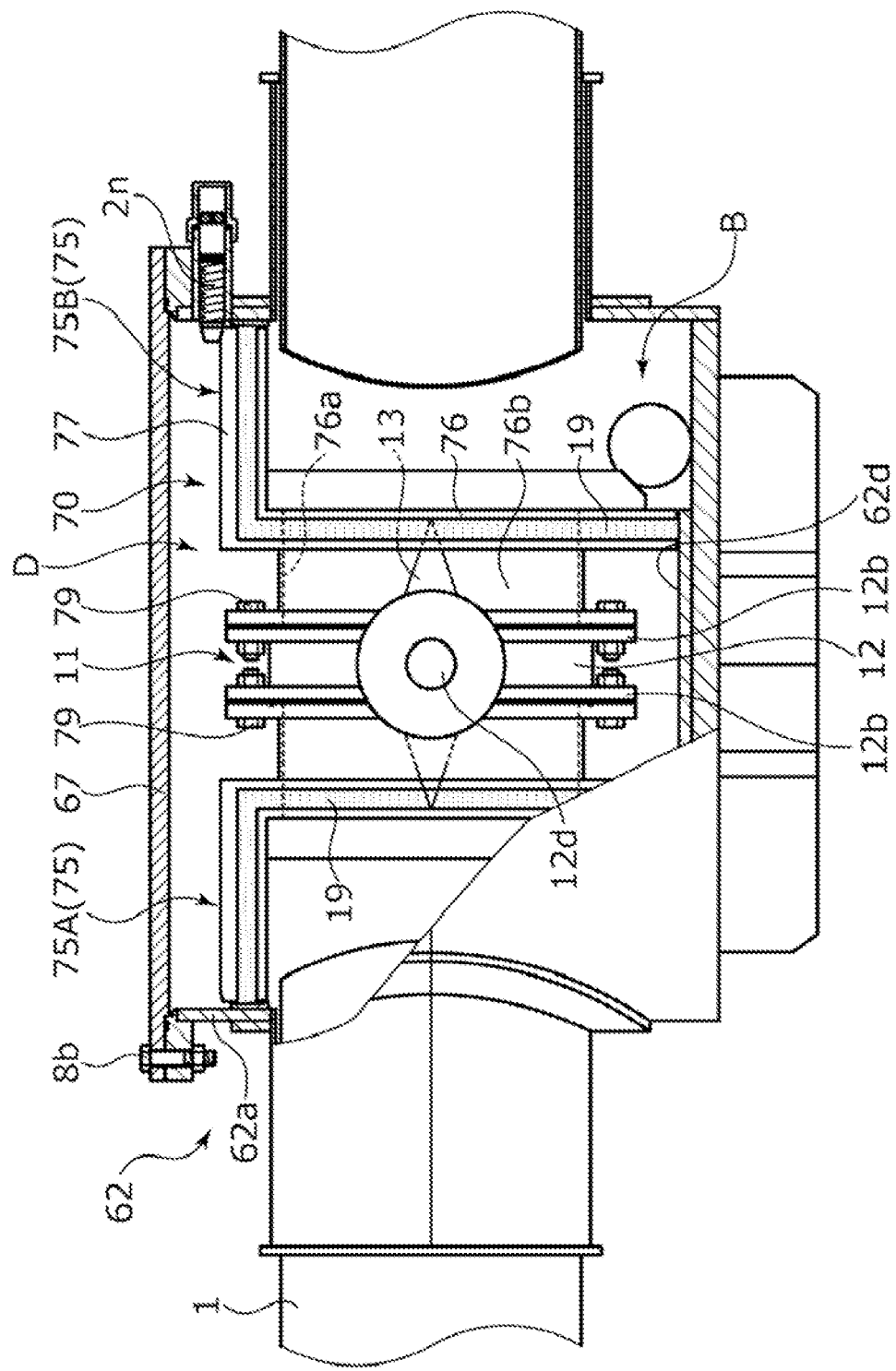
FIG. 16 is a partially sectional front view showing a state where the fluid control body of the second embodiment is installed in the casing.
Figure 17:
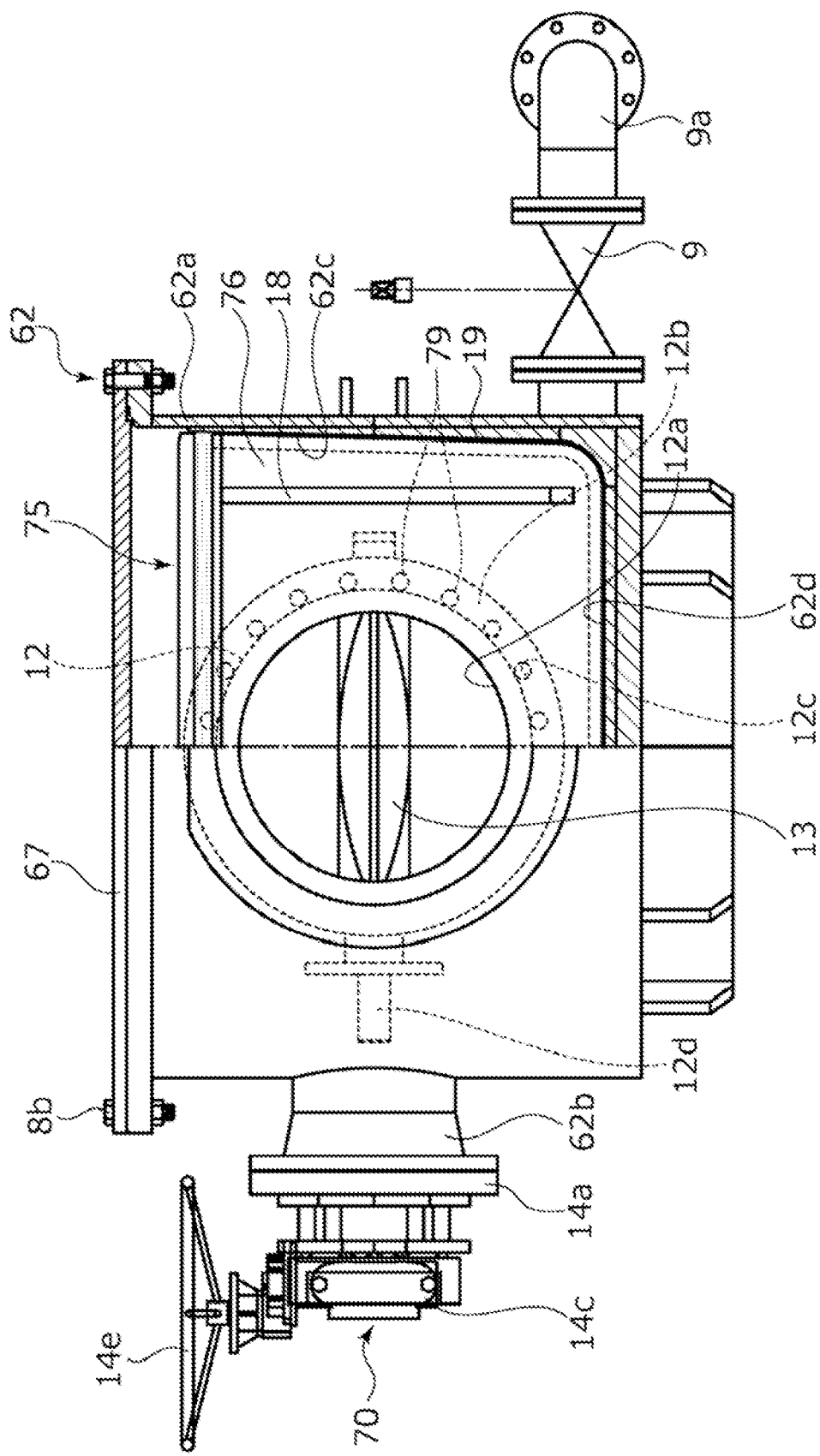
FIG. 17 is a partially sectional side view as well as FIG. 16.
Figure 18:
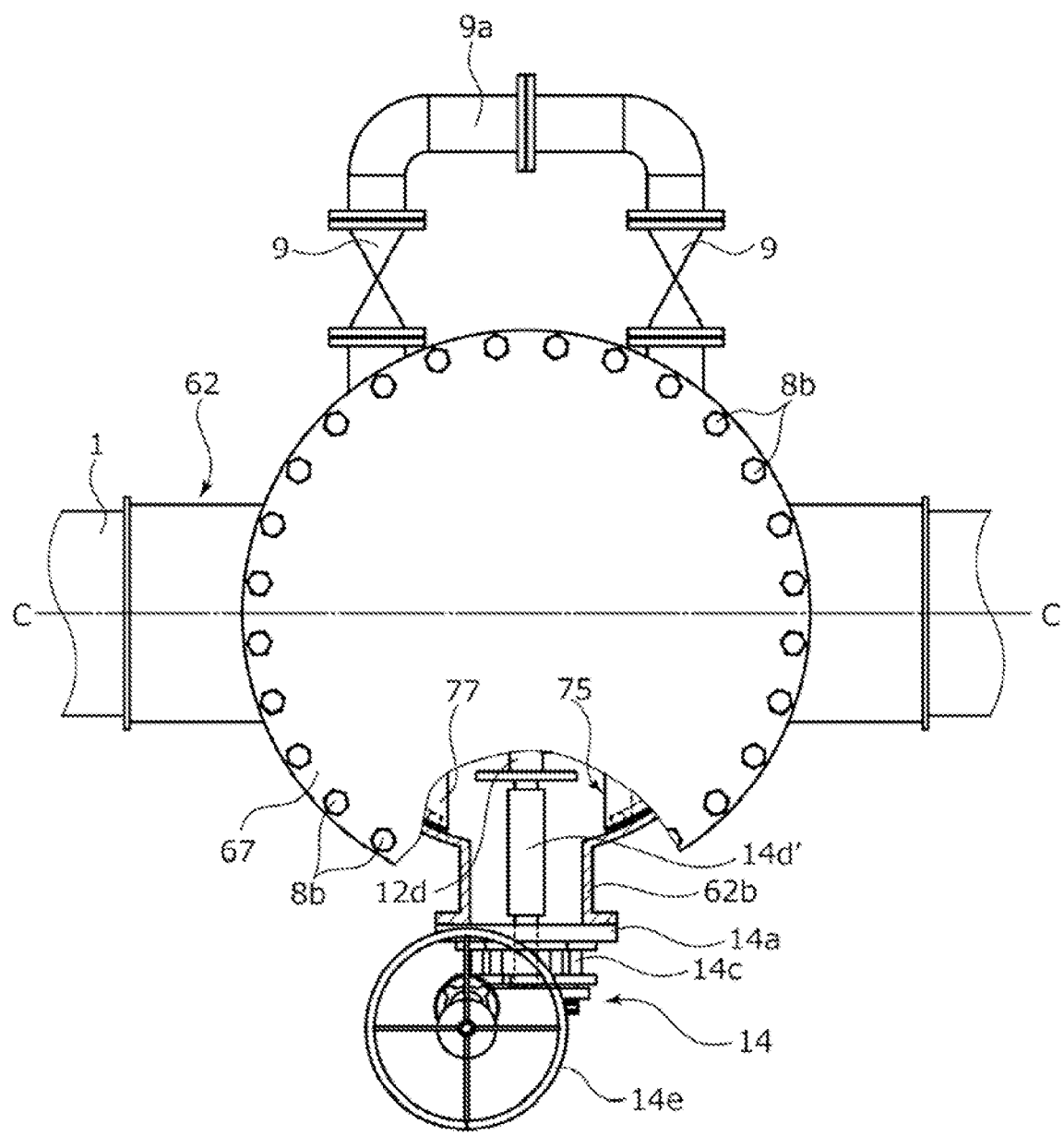
FIG. 18 is a partially sectional plan view as well as FIG. 16.

The installment method of the fluid control body and the fluid control device including the fluid control body according to the second embodiment are different from the first embodiment in a point that a cutting machine 50 that cuts off a predetermined point of a fluid pipe 1 in a casing 62 and an inserting machine 60 that installs a fluid control body 70 in the casing 62 approaches the casing 62 from the substantially vertically upper side to the lower side. The fluid control device of the second embodiment is formed mainly by the fluid control body 70 and the casing 62 as shown in FIGS. 16 to 18.

Figure 14:
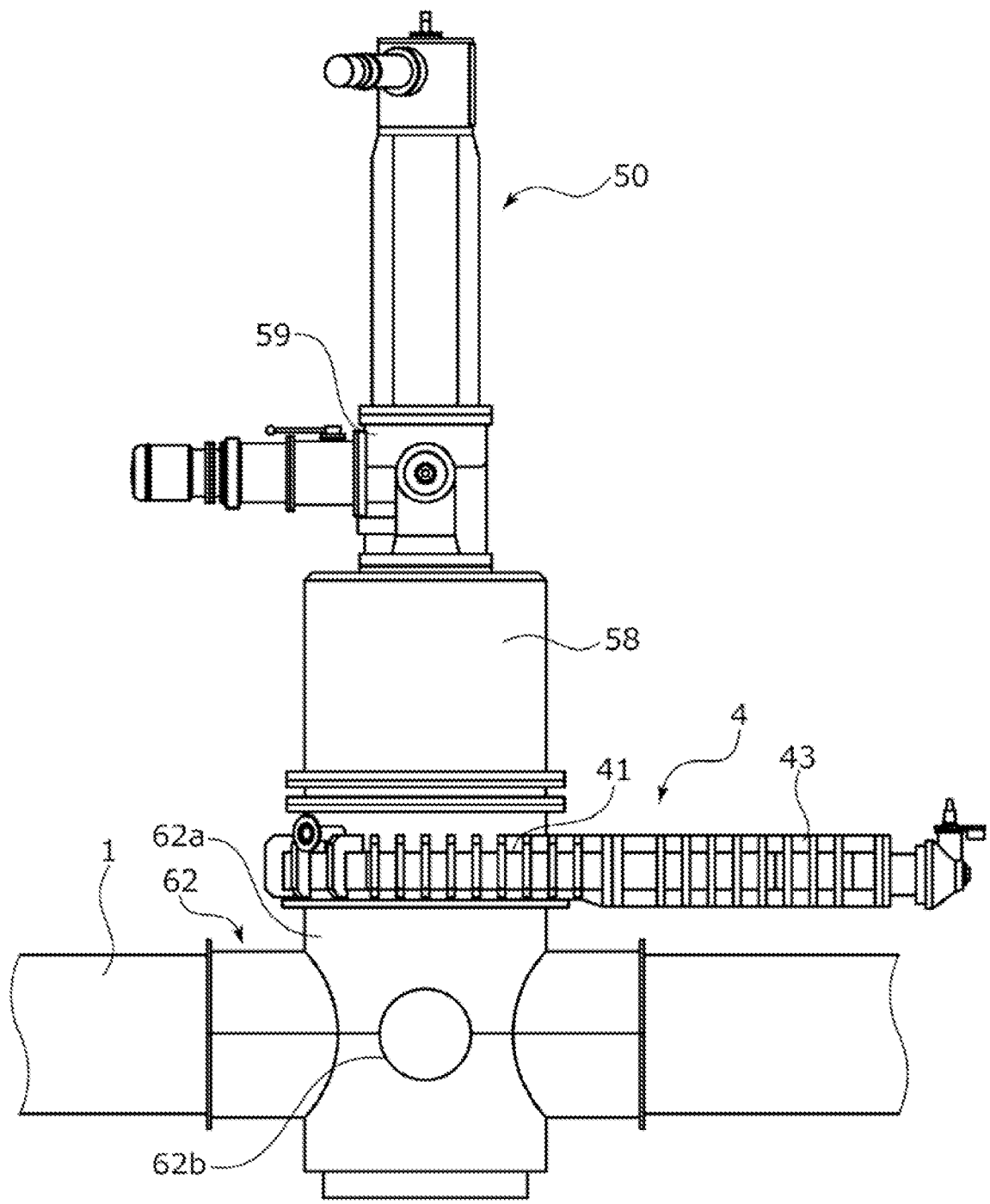
FIG. 14 is a front view showing a state where a process valve and a cutting machine are attached to a casing of a second embodiment.

As shown in FIG. 14, for example, a periphery of the predetermined point of the fluid pipe 1 embedded in the ground is dug up (not shown), and the casing 62 of an up-down evenly-divided structure, the casing having a branch portion 62a which opens on the substantially vertically upper side and communicates with the inside and an opening portion 62b which opens substantially horizontally and communicates with the inside is fitted on to surround the point in a sealed manner. The casing 62 of the second embodiment is formed in a bottomed pipe of a substantially circular shape in a plan view having a larger diameter than that of the casing 2 of the first embodiment. Further, the casing 62 is fitted onto the fluid pipe 1 at a position where the center of the casing 62 in a plan view substantially matches with the pipe axis C of the fluid pipe 1 (see FIG. 18).

Next, as shown in FIG. 14, a cut-off step of cutting off the fluid pipe 1 in the casing 62 by the cutting machine 50 will be described. First, a process valve 4 capable of opening/closing an opening of the casing 62 is attached to a flange portion of the branch portion 62a of the casing 62. The process valve 4 is formed mainly by a valve box 41 connected to the branch portion 62a of the casing 62 in a sealed manner in a communicated state, a valve lid 43 connected to one side of this valve box 41 in a sealed manner in a communicated state, and a valve element (not shown) slidably arranged over the inside of the valve box 41 and the inside of the valve lid 43.

The cutting machine 50 for cutting off the fluid pipe 1 is installed on the further upper side of the process valve 4. The cutting machine 50 is formed mainly by an attachment flange cylinder 58 connected to the valve box 41 in a sealed manner in a communicated state, the attachment flange cylinder passing through in the up and down direction, a cutter (not shown) arranged in this attachment flange cylinder 58, and a drive mechanism 59 for moving this cutter in the up and down direction and driving and rotating the cutter on the axis of the up and down direction. The drive mechanism 59 provided in the cutting machine 50 of the second embodiment is a normal drive mechanism longer than the drive mechanism 53 of the first embodiment described above, the drive mechanism including no extendable gripping member, etc.

Next, although not particularly shown in the figures, the valve element of the process valve 4 is retreated into the valve lid 43 and the branch portion 62a is opened, and by using the cutting machine 50 described above, while driving and rotating the cutter and letting the cutter go downward to the fluid pipe 1 by the drive mechanism 59, the fluid pipe 1 is cut off in an uninterrupted flow state.

Once the fluid pipe 1 is cut off by the cutter, by pulling the cutter up to the inside of the attachment flange cylinder 58 together with coupon of the fluid pipe 1 and closing the branch portion 62a by the valve element of the process valve 4, a cut-off task of the fluid pipe 1 is completed.

Figure 15:
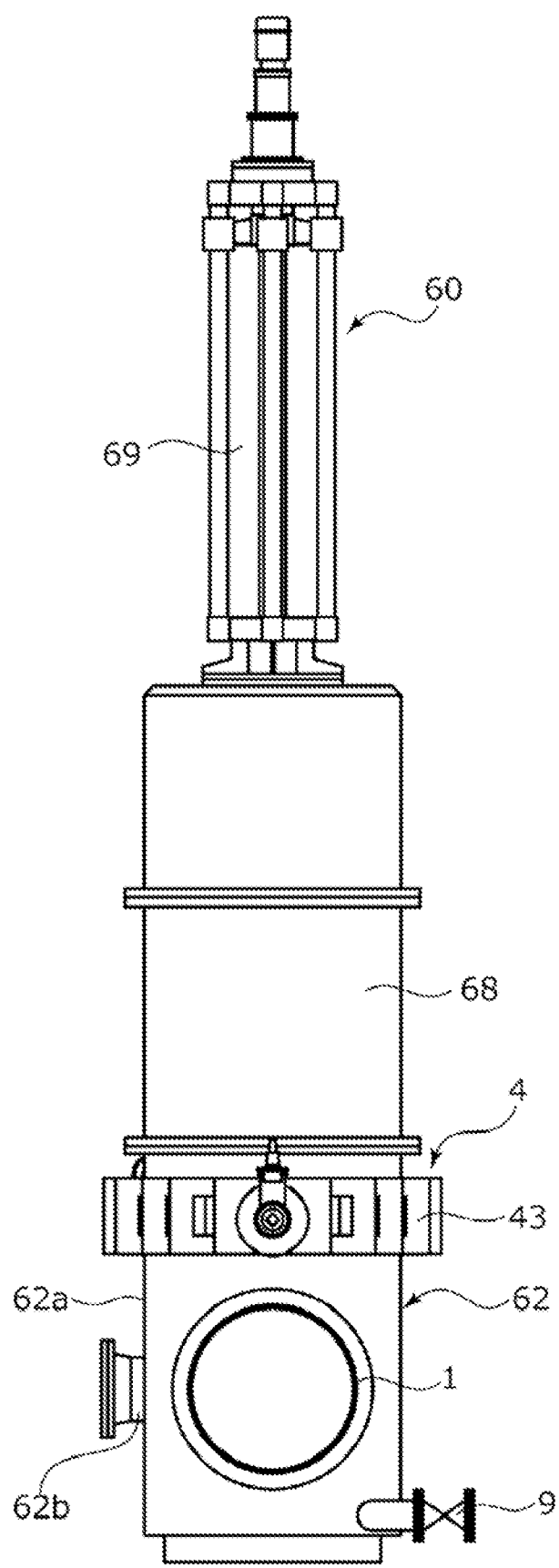
FIG. 15 is a side view showing a state where an inserting machine including a fluid control body is attached to the casing.

Next, as shown in FIGS. 15 and 16, a step of installing the fluid control body 70 in an uninterrupted flow at the point where the fluid pipe 1 is cut off in the casing 62 state will be described. First, while in a state where the branch portion 62a is closed by the valve element of the process valve 4, the inserting machine 60 to which the fluid control body 70 is connected is attached to an upper portion of the process valve 4 in a sealed state. The inserting machine 60 of the present embodiment is formed mainly by a cylindrical member 68 formed to pass through in the up and down direction, the cylindrical member inside which the fluid control body 70 is arranged, and a drive mechanism 69 for moving this fluid control body 70 in the up and down direction. The drive mechanism 69 provided in the inserting machine 60 of the second embodiment is a normal drive mechanism longer than the drive mechanism 53 of the first embodiment described above, the drive mechanism including no extendable gripping member, etc.

Next, as shown in FIGS. 16 to 18, the fluid control body 70 according to the present embodiment and an assembling step thereof will be described. The fluid control body 70 is formed mainly by a butterfly valve 11 serving as an on-off valve which is a versatile standardized or commercialized product, and partition bodies 75 mounted on this butterfly valve 11 by connection tools 79 such as bolts.

The butterfly valve 11 forming the fluid control body 70 of the second embodiment is formed similarly to the first embodiment described above. An opening portion 12a of the butterfly valve 11 of the second embodiment is arranged substantially concentrically to the center of the fluid pipe 1, and has the approximately same opening diameter as an inner diameter of the fluid pipe 1. A valve element 13 of the present embodiment is turnable on an operation shaft 12d arranged in the substantially horizontal direction at a position of substantially-center height of the fluid pipe 1.

Next, the partition bodies 75 have a divided structure in which a pair of partition bodies 75A, 75B is attached to flange portions 12b of a valve seat body 12 of the butterfly valve 11 on the front and back sides in the pipe axis direction. The partition bodies 75 are mounted and fixed by the connection tools 79 inserted through bolt holes 12c of the flange portions 12b.

In more detail, as shown in FIGS. 16 to 18, the partition bodies 75 are formed by the pair of integrated steel components provided in the pipe axis direction, each of the steel components including a wall portion 76 which integrally has a short pipe portion 76b extending in the axial direction, the short pipe portion in which a through hole 76a communicating with the opening portion 12a of the butterfly valve 11 substantially concentrically with the approximately same diameter is formed to pass through, the wall portion communicating with and being opened at a pipe end of this short pipe portion 76b, and a lid portion 77 provided continuously to this wall portion 76 along the circumferential direction of an inner peripheral surface of the branch portion 62a positioned in an upper portion of the casing 62 on the opposite side of the short pipe portion 76b in the axial direction. This wall portion 76 has a shape extending outward with respect to the valve seat body 12 of the butterfly valve 11, and is provided at a position eccentric to one side with respect to the center of the lid portion 77. This lid portion 77 is arranged to cover the branch portion 62a in the substantially horizontal direction.

The lid portion 77 of the partition body 75 of the second embodiment is provided to cover the upper side of the butterfly valve 11. Meanwhile, the operation shaft 12d of the butterfly valve 11 does not cross the lid portion 77 but is extended in the substantially horizontal direction on the lower side of the lid portion 77. By doing so, the operation shaft 12d of the butterfly valve 11 is not brought into contact with the lid portion 77. Thus, there is no need for forming an axial hole or a space in the lid portion 77 and it is possible to enhance freedom in designing.

As shown in FIG. 16, the valve element 13 of the second embodiment is formed to be operated to open/close inside the short pipe portions 76b, 76b of the pair of wall portions 76, 76. The present invention is not necessarily limited to the short pipe portion 76b integrated with the wall portion 76 but the short pipe portion 76b may be formed as a separate body from the wall portion 76 while being connectable. In this case, however, the short pipe portion 76b and the wall portion 76 are placed in a sealed manner.

As well as the first embodiment, the fluid control body 70 of the second embodiment is formed by assembling the butterfly valve 11 and the partition bodies 75 into each other in a sealed manner. However, this assembling step of the fluid control body 70 may be performed at least before the installment step of installing the fluid control body 70 in the casing 62 to be described later, or may be performed before the cut-off step of the fluid pipe 1 or after the cut-off step.

Next, the installment step of installing the fluid control body 70 in the casing 62 will be described with reference to FIG. 15. A valve suspending tool (not shown) coupled to the drive mechanism 69 is connected to an upper end of the fluid control body 70 formed by the butterfly valve 11 and the partition bodies 75 described above, and the fluid control body 70 is inserted vertically downward to the point where the fluid pipe 1 is cut off in the casing 62 by the drive mechanism 69.

As shown in FIG. 17, side wall step portions 62c, 62c serving as seal seat portions which project to the inner side of the casing 62 with respect to the other parts are formed on side portion inner wall surfaces of the casing 62 to oppose each other. This side wall step portion 62c is extended to oppose the seal component 19 described above in a tapered shape to gradually come close to each other to the lower side. Therefore, at the time of inserting the fluid control body 70 into the casing 62, the fluid control body 70 is inserted into the casing 62 in a separated state where a side portion of the seal component 19 provided in the wall portion 76 is close to the side wall step portion 62c. At the same time as the fluid control body 70 is installed in the casing 62, the side portion of the seal component 19 is compressed to the side wall step portion 62c. The side wall step portions 62c, 62c are not limited to projection forming but may be flush with another inner surface without projecting or be a recessed portion.

As shown in FIGS. 16 and 17, at the time of inserting the fluid control body 70 downward into the casing 62 by predetermined depth, bottom portions of the seal components 19 provided in the wall portions 76 are compressed to a bottom wall step portion 62d serving as a seal seat portion which projects on a bottom surface inside the casing 62. As well as the first embodiment described above, a projected portion projecting upward may be provided in the center of the bottom wall step portion 62d and bottom portions of the wall portions 76 of the pair of partition bodies 75 may be fitted to the projected portion while leaving some allowance.

Next, plural fixing screws 2n provided in the circumferential direction of the branch portion 62a of the casing 62, the fixing screws being capable of going forward and backward in the radial direction go forward in the inner diameter direction of the branch portion 62a. Thereby, the fixing screws 2n hold the lid portion 77 to press from the upper side against fluid pressure in the casing 62, and it is possible to prevent the fluid control body 70 from drawing out of the branch portion 62a.

By pressing the lid portion 77 from the upper side by the fixing screws 2n in such a way, it is possible to detach the inserting machine 60 formed by the cylindrical member 68 and the drive mechanism 69, the process valve 4, etc. from the casing 62.

By installing the fluid control body 70 in the casing 62 in such a way, by the seal components 19 provided in the fluid control body 70 and the sealing member described above, the inside of the casing 62 is partitioned into an inside region B communicating with the inside of the fluid pipe 1 and forming a flow passage, and an outside region D excluding this inside region B in a sealed manner. Next, inside the casing 62, the fluid of the outside region D is suctioned and removed by a pump (not shown) to make the outside region D a void space where no fluid in a pipe exists. By doing so, even in a case where for example a standardized or commercialized product is used straightaway as the butterfly valve 11, and even with standardized coating, the butterfly valve 11 is brought into contact with the fluid in the pipe only in time which is the time of inserting, and after insertion, installed in the casing 62 in a dry state and in a state where the butterfly valve 11 is protected from contact with heavy machineries. Thus, corrosion resistance, accident prevention, and leakage prevention are excellent.

Next, a lid member 67 formed in a substantially circular shape in a plan view is fixed to the flange of the branch portion 62a in a sealed manner by a bolt-nut 8b. The lid member 67 preferably prevents the fluid control body 70 from drawing out of the branch portion 62a together with the fixing screws 2n. Next, a speed reducer 14c of an operation portion 14 arranged on the outer side of the casing 62 and the operation shaft 12d of the valve seat body 12 forming the butterfly valve 11 are relatively non-turnably coupled and fixed to each other via a coupling body 14d' longer than the coupling body 14d of the first embodiment. The speed reducer 14c of the operation portion 14 is connected and fixed to the opening portion 62b of the casing 62 in a sealed manner via a seal member (not shown), and an operation ring 14e capable of operating to turn the operation shaft 12d of the valve seat body 12 via the coupling body 14d' is attached to this speed reducer 14c. By operating to turn on the operation axis arranged in the substantially vertical direction, the operation ring 14e transmits turning force to the operation shaft 12d arranged in the substantially horizontal direction inside the casing 62 via the speed reducer 14c, so that the valve element 13 can be operated to open/close. Thereby, installment of the fluid control body 70 into the casing 62 is completed.

In such a way, the installment step of the second embodiment is a step of inserting and installing the fluid control body 70 substantially vertically downward to the inside of the casing. Thus, it is possible to minimize a plane area around the fluid pipe 1 required for the work. Therefore, it is possible to simplify supplementary works such as open-cut and excavation works.

Next, a modified example of the fluid control body and the casing according to the second embodiment will be described with reference to FIGS. 19 to 21. The same configurations as the embodiment described above will not be repeatedly described.

Figure 19:
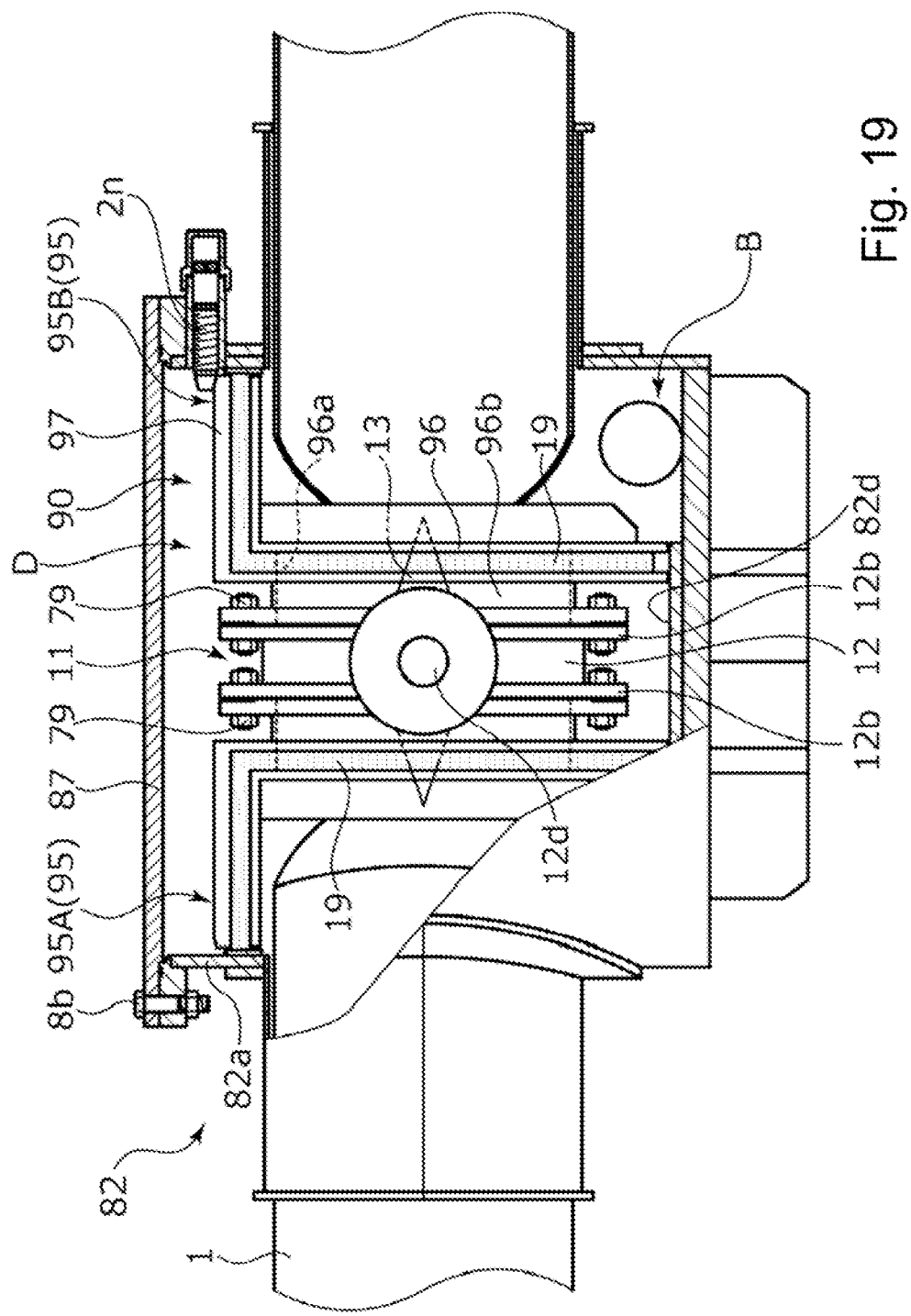
FIG. 19 is a partially sectional front view showing a state where a fluid control body of a modified example of the second embodiment is installed in a casing.
Figure 20:
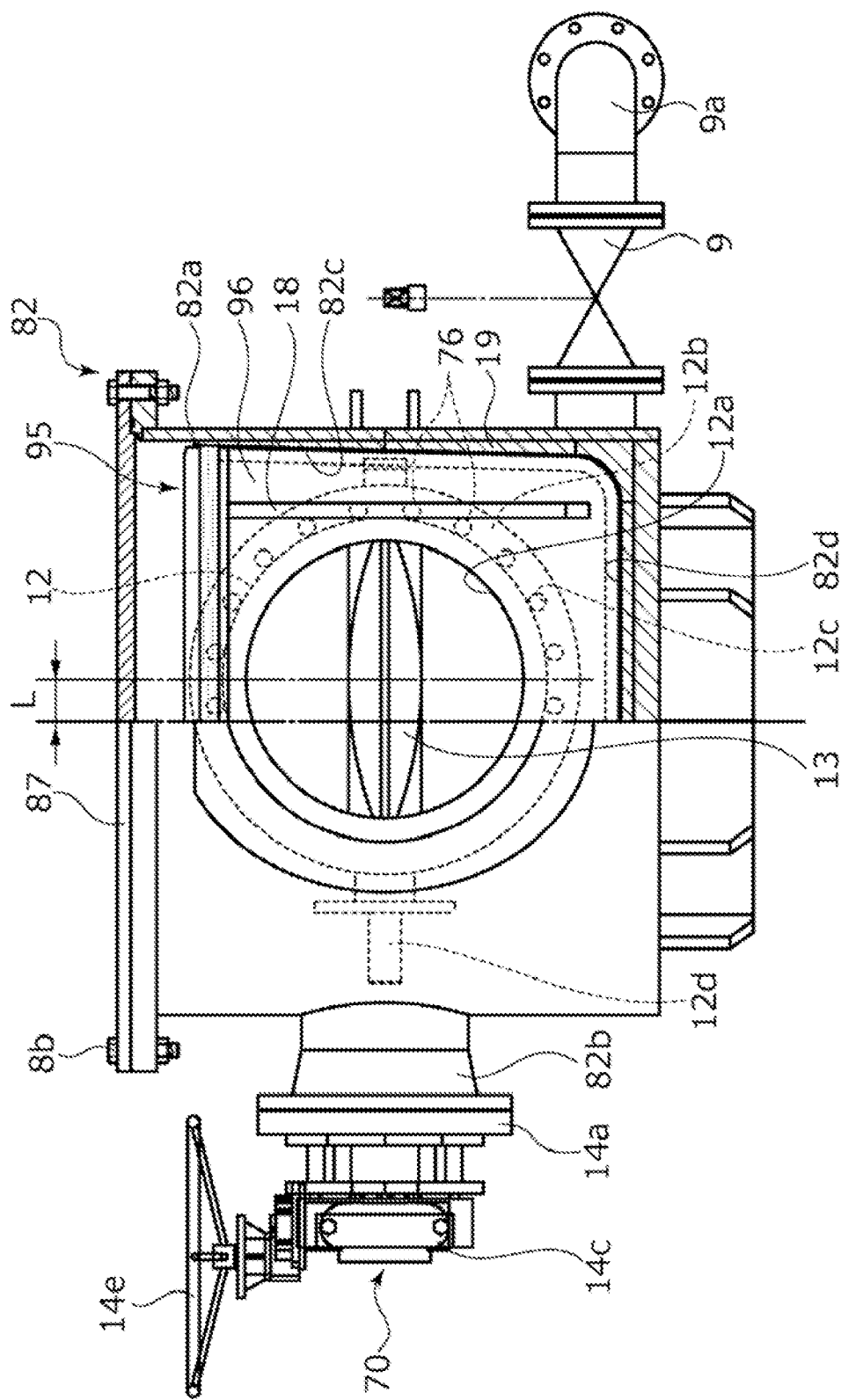
FIG. 20 is a partially sectional side view as well as FIG. 19.
Figure 21:
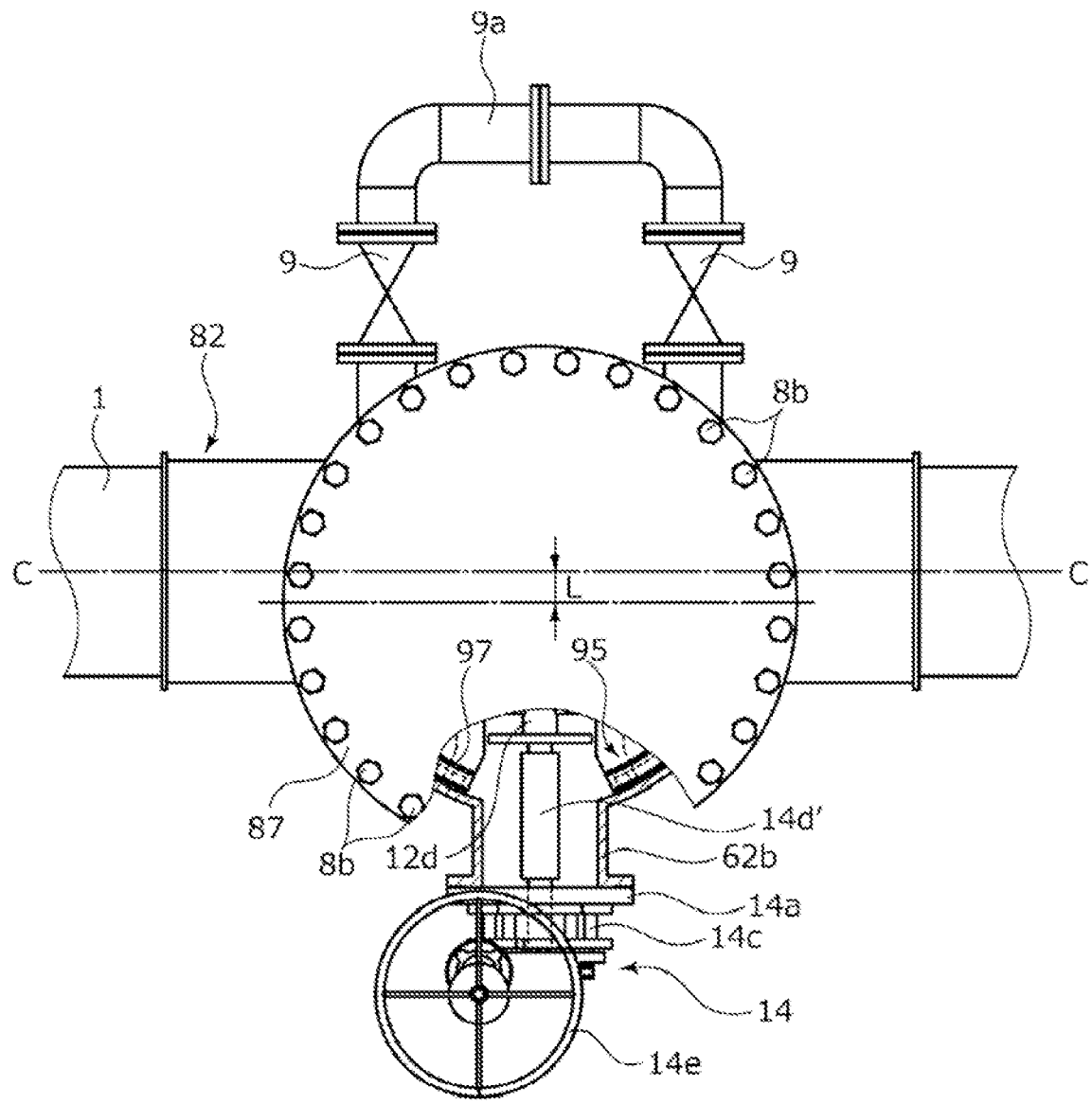
FIG. 21 is a partially sectional plan view as well as FIG. 19.

As shown in FIGS. 19 to 21, a casing 82 of the present modified example is different from the second embodiment in a point that the casing 82 is formed in a bottomed pipe of a substantially circular shape in a plan view having a smaller diameter than that of the casing 62 of the second embodiment, but the other points are the same as the casing 62 of the second embodiment. Further, the center of the casing 82 in a plan view does not match with the pipe axis C of the fluid pipe 1, and the casing 82 is fitted onto the fluid pipe 1 at a position where the center in a plan view is eccentric to the lower side in the figure with respect to the pipe axis C by separation dimension L. A fluid control body 90 of the present modified example is installed in the casing 82 at a position where the center of the opening portion 12a of the valve seat body 12 to be opened/closed by the valve element 13 substantially matches with the pipe axis C.

The fluid control body 90 of the present modified example is different from the second embodiment in a point that each of partition bodies 95 forming the butterfly valve 11 has a short pipe portion 96b shorter than the second embodiment and lid portions 97, 97 have the approximately same outer diameter as an inner diameter of the casing 82, but the other points are the same as the fluid control body 70 of the second embodiment.

According to the present modified example, while ensuring the same extension dimension in the horizontal direction from the pipe axis C of the fluid pipe 1 to the operation portion 14 as the second embodiment, it is possible to shorten extension dimension on the opposite side of the operation portion 14 in the horizontal direction from the pipe axis C of the fluid pipe 1. Thus, it is possible to compactify a structure and a shape of the whole device while maintaining control properties and a sealing property.

Figure 22:
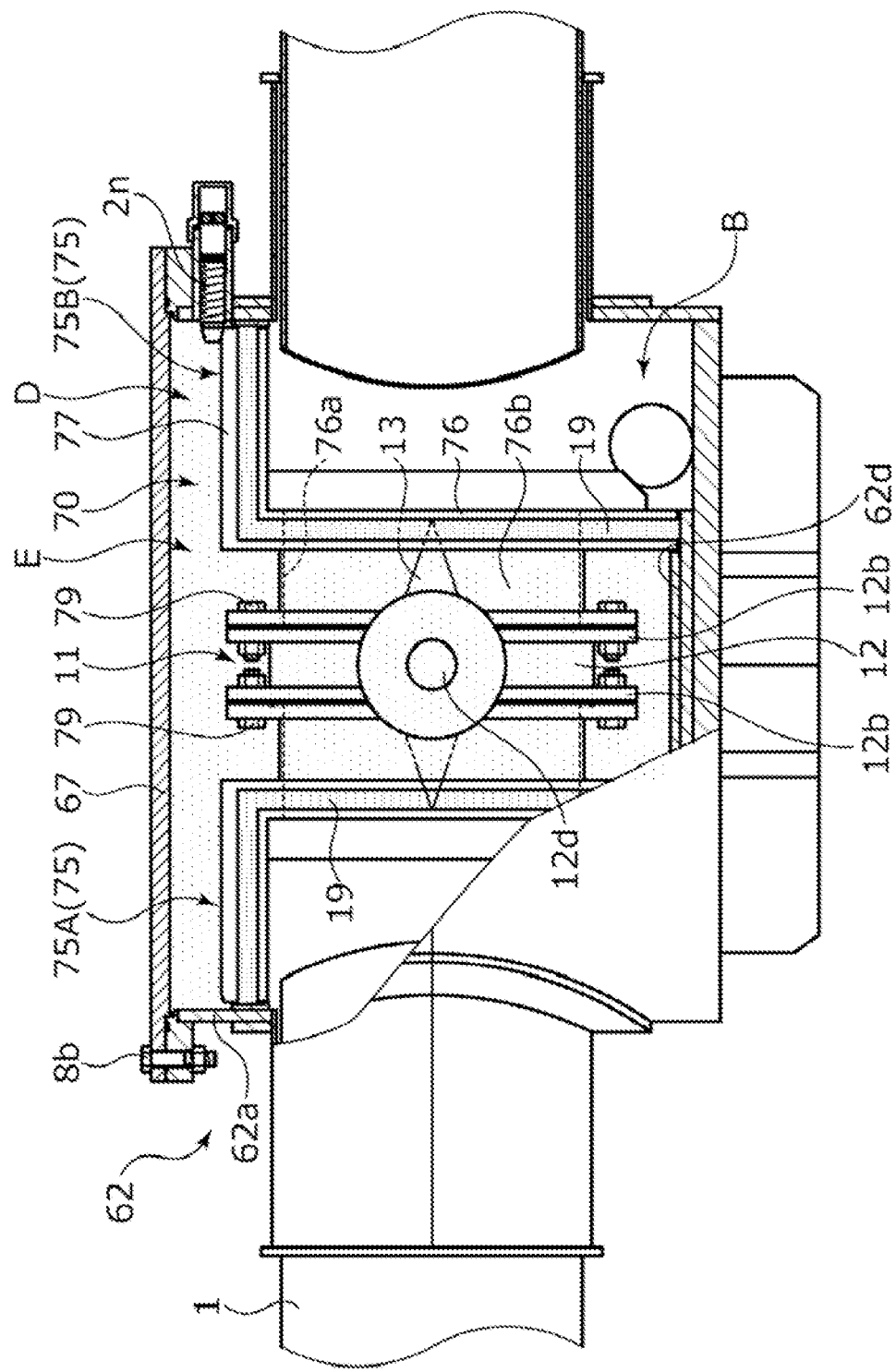
FIG. 22 is a partially sectional front view showing a state where a fluid control body of another modified example of the second embodiment is installed in the casing.

As shown in FIG. 22 as another modified example of the fluid control body of the present invention, the fluid control body 70 formed by the butterfly valve 11 and the partition bodies 75 may be formed by filling and fixing with a deformable filling agent E formed by a thermoplastic substance, thermosetting resin, a filler, a two-component hardener, an adhesive, etc. to supplement the outside region D. In this case, at least an outside region D formed between the butterfly valve 11 and the partition bodies 75 is required to be filled but for example an outside region D between the partition bodies 75 and the lid member 67 is not required to be filled.

By installing the deformable filling agent E to supplement the outside region D in the casing 2 in such a way, it is possible not only to protect the fluid control body 10 and the casing 2 without damages at the time of installment but also to reduce an amount of the fluid in contact with and remaining in the outside region D to a large extent. It is also possible to suppress a possibility that mainly outer surface coating of the butterfly valve 11 of the standardized or commercialized product with standard coating is brought into contact with the fluid in the pipe and leached away.

In addition, for example, although not particularly shown in the figures, a cap component attached to an outer surface of the fluid control body 10 and made of an elastic material, the cap component having an outer surface shape to supplement the outside region D formed in a state where the fluid control body 10 is installed may be detachably and additionally formed.

The cap component may have a structure of an appropriate number of divisions. After the fluid control body 10 to which the cap components are attached is installed in the casing 2, these cap components may be detached from this fluid control body 10. The present invention is not necessarily limited to detachment of the cap components from the fluid control body 10 but the fluid control body 10 may be left in the casing 2 with the cap components being attached. Further, the present invention is not limited to the cap components made of an elastic material but metal or resin may be combined with an elastic body, for example, the cap components may be attached to the butterfly valve 11 or the partition bodies 15 in a sealed manner by using bolts, etc.

Figure 23:
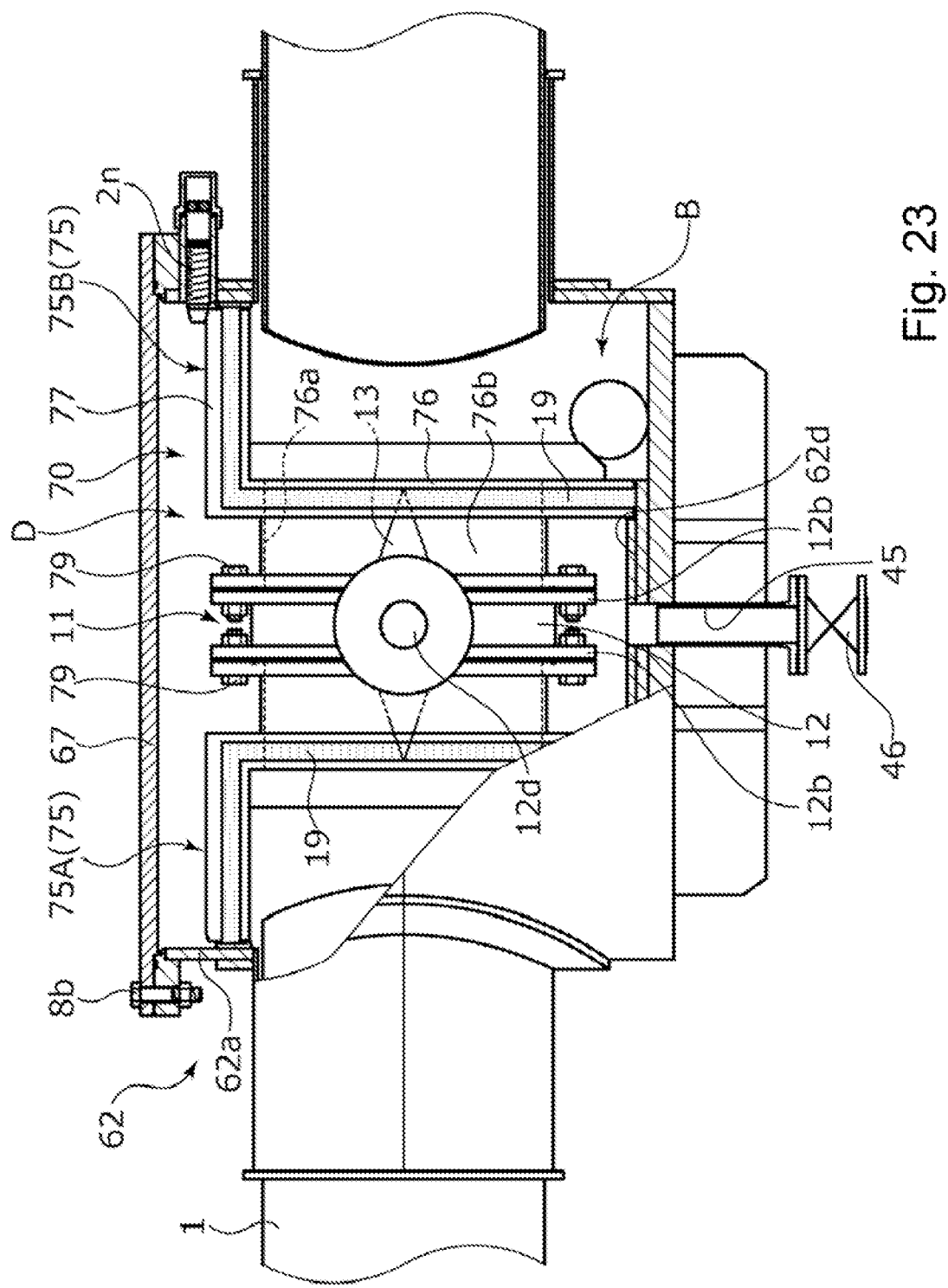
FIG. 23 is a partially sectional front view showing a casing of a modified example of the second embodiment.

In order to remove the fluid remaining in the outside region D, the present invention is not limited to suctioning by the pump described above, etc. For example, as shown in FIG. 23 as a modified example of the casing of the present invention, a drain flow passage 45 communicating with the outside region D and the outside of the casing 2 may be formed at a predetermined point of the projected portion 2e, etc. on the bottom portion side of the casing 2, a valve 46 that opens/closes this drain flow passage 45 may be attached, and the fluid remaining in the outside region D may be discharged to the outside of the casing 2 via the drain flow passage 45 by opening this valve 46.

The embodiments of the present invention are described above with the drawings. However, specific configurations are not limited to these embodiments but the present invention includes changes and additions within the range not departing from the gist of the present invention.

For example, in the above embodiments, the butterfly valve 11 serving as the on-off valve is a versatile standardized or commercialized product and major components of the butterfly valve 11 are made of cast iron. However, the present invention is not limited to this but the on-off valve may be a custom-made product or may be made of steel, resin, etc.

In addition, for example, in the above embodiments, the partition bodies are made of steel components. However, the present invention is not limited to this but the partition bodies may be made of cast iron, resin, etc.

In addition, for example, in the above embodiments, the endless seal components are formed and provided in the partition bodies. However, the present invention is not limited to this but non-endless seal components may be formed and end portions may be adhered to each other, or seal components may be intermittently formed to achieve a sealed state.

Further, for example, in the above embodiments, the butterfly valve 11 has corrosion resistance by coating. However, the present invention is not limited to this but, for example, plating, vulcanization, etc. may be applied as long as that is an effective corrosion resistance treatment.

The invention claimed is:

1. An Installment method of a fluid control body of installing the fluid control body that controls a fluid in a pipe inside a casing externally fitted onto a fluid pipe in a sealed manner in an uninterrupted flow state, the installment method comprising:
   a cut-off step of cutting off part of the fluid pipe inside the casing; and
   an installment step of installing the fluid control body inside the casing, the fluid control body including
      an on-off valve formed by a valve seat body which includes an opening portion and a valve element which is provided in the valve seat body in such a manner that the opening portion is openable and closable, and
      a partition body formed by a wall portion that is provided with a through hole communicating with the opening portion, the wall portion being mounted on the valve seat body in a sealed manner, and a lid portion which is provided continuously to the wall portion, the lid portion covering an opening side of the casing, the partition body including a seal component that seals a gap between an inner surface of the casing and the partition body,
   the installment step is a step of installing fluid control body by using plural shaft members to be attached to and detached from each other in an installment direction of the fluid control body, and
   in the installment step, the fluid control body being installed inside the casing in a sealed manner in a state where an operation shaft of the on-off valve is placed so as to extend in a direction different from a vertical direction.

2. The installment method of the fluid control body according to claim 1, wherein
   the installment step is a step of inserting and installing the fluid control body to an inside of the casing in a substantially horizontal direction.

3. The installment method of the fluid control body according to claim 2, wherein
   the installment step is a step of installing the fluid control body by using a load receiving portion that slidably supports the fluid control body.

4. The installment method of the fluid control body according to claim 1, wherein
   the installment step is a step of inserting and installing the fluid control body in the vertical direction to an inside of the casing.

* * * * *